(12) United States Patent
Wan et al.

(10) Patent No.: US 12,186,660 B2
(45) Date of Patent: Jan. 7, 2025

(54) VIRTUAL CHARACTER CONTROL METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Yulin Wan, Shenzhen (CN); Xun Hu, Shenzhen (CN); Jianmiao Weng, Shenzhen (CN); Shandong Su, Shenzhen (CN); Yong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 367 days.

(21) Appl. No.: 17/570,391

(22) Filed: Jan. 7, 2022

(65) Prior Publication Data
US 2022/0126205 A1    Apr. 28, 2022

Related U.S. Application Data

(63) Continuation of application No. PCT/CN2021/080690, filed on Mar. 15, 2021.

(30) Foreign Application Priority Data

Apr. 23, 2020  (CN) .......................... 202010328532.3

(51) Int. Cl.
*A63F 13/00* (2014.01)
*A63F 13/52* (2014.01)
(Continued)

(52) U.S. Cl.
CPC ............ *A63F 13/533* (2014.09); *A63F 13/52* (2014.09); *A63F 13/56* (2014.09); *A63F 13/537* (2014.09);
(Continued)

(58) Field of Classification Search
CPC ........ A63F 13/533; A63F 13/52; A63F 13/56; A63F 13/537; A63F 2300/308; A63F 2300/65; A63F 2300/6607
See application file for complete search history.

(56) References Cited

U.S. PATENT DOCUMENTS 8,142,286 B2 *   3/2012  Sayyadi ............... A63F 13/5255
                                                              463/43
8,777,708 B2 *   7/2014  Langridge ............... A63F 13/45
                                                              463/7
(Continued)

FOREIGN PATENT DOCUMENTS

CN   107398071 A   11/2017
CN   107835148 A    3/2018
(Continued)

OTHER PUBLICATIONS

Intellectual Property Office of Singapore Search report for Application No. 11202112169U Sep. 19, 2023 12 pages.
(Continued)

*Primary Examiner* — Dmitry Suhol
*Assistant Examiner* — Jason Pinheiro
(74) *Attorney, Agent, or Firm* — ANOVA LAW GROUP, PLLC

(57) ABSTRACT

A virtual character control method includes: displaying a virtual environment interface; receiving a skill cast operation and a movement control operation, the skill cast operation being used for casting a directional skill in a first direction, and the movement control operation being used for controlling a main control virtual character to move in a second direction, the first direction and the second direction being independent of each other; and controlling the main control virtual character to cast the directional skill in the second direction. When the directional skill is cast, the second direction is determined according to the received
(Continued)

movement control operation, and the main control virtual character is controlled to cast the directional skill in the second direction.

17 Claims, 14 Drawing Sheets

(51) Int. Cl.
*A63F 13/533* (2014.01)
*A63F 13/56* (2014.01)
*A63F 13/537* (2014.01)

(52) U.S. Cl.
CPC ..... *A63F 2300/308* (2013.01); *A63F 2300/65* (2013.01); *A63F 2300/6607* (2013.01)

(56) References Cited

U.S. PATENT DOCUMENTS

| | | | |
|---|---|---|---|
| 8,834,245 B2* | 9/2014 | Haigh-Hutchinson | A63F 13/10 463/2 |
| 9,295,912 B2* | 3/2016 | Garvin | A63F 13/837 |
| 9,327,191 B2* | 5/2016 | Miyamoto | A63F 13/335 |
| 9,770,664 B2* | 9/2017 | Jo | A63F 13/30 |
| 10,039,980 B2* | 8/2018 | Matsui | A63F 13/42 |
| 10,500,504 B2* | 12/2019 | Shao | A63F 13/426 |
| 10,857,462 B2* | 12/2020 | Wei | A63F 13/837 |
| 10,990,274 B2 | 4/2021 | Nakahara | |
| 11,446,578 B2* | 9/2022 | Tanaka | A63F 13/525 |
| 2005/0071306 A1* | 3/2005 | Kruszewski | A63F 13/10 345/473 |
| 2006/0040740 A1* | 2/2006 | DiDato | A63F 13/42 463/7 |
| 2006/0084509 A1* | 4/2006 | Novak | A63F 13/30 463/30 |
| 2006/0199626 A1* | 9/2006 | Ortiz | A63F 13/5375 463/2 |
| 2006/0258454 A1* | 11/2006 | Brick | A63F 13/837 463/36 |
| 2007/0117628 A1* | 5/2007 | Stanley | A63F 13/212 463/36 |
| 2007/0270215 A1* | 11/2007 | Miyamoto | A63F 13/45 463/32 |
| 2010/0009733 A1* | 1/2010 | Garvin | A63F 13/10 463/37 |
| 2015/0094127 A1* | 4/2015 | Canose | G06F 3/04842 463/2 |
| 2015/0378459 A1* | 12/2015 | Sawada | G06F 3/0488 345/173 |
| 2016/0361649 A1* | 12/2016 | Hayashi | A63F 13/5255 |
| 2017/0113137 A1 | 4/2017 | Alexeev | |
| 2017/0149241 A1 | 5/2017 | Binder | |
| 2018/0015375 A1* | 1/2018 | Marino | A63F 13/537 |
| 2018/0104584 A1 | 4/2018 | Utsugi | |
| 2018/0200616 A1* | 7/2018 | Li | A63F 13/214 |
| 2018/0290058 A1 | 10/2018 | Zhang et al. | |
| 2019/0091561 A1* | 3/2019 | Li | A63F 13/837 |
| 2019/0118089 A1* | 4/2019 | Ying | A63F 13/837 |
| 2019/0126148 A1* | 5/2019 | Wei | A63F 13/2145 |
| 2019/0265882 A1 | 8/2019 | Nakahara | |
| 2022/0126205 A1 | 4/2022 | Wan et al. | |

FOREIGN PATENT DOCUMENTS

| | | |
|---|---|---|
| CN | 108196765 A | 6/2018 |
| CN | 109550240 A | 4/2019 |
| CN | 109806579 A | 5/2019 |
| CN | 109865286 A | 6/2019 |
| CN | 109982756 A | 7/2019 |
| CN | 110413171 A | 11/2019 |
| CN | 110694261 A | 1/2020 |
| CN | 111589127 A | 8/2020 |
| EP | 3943172 A4 | 7/2022 |
| JP | 2018075225 A | 5/2018 |
| JP | 2019154668 A | 9/2019 |
| JP | 2019202128 A | 11/2019 |
| JP | 2020039857 A | 3/2020 |
| KR | 20190057381 A | 5/2019 |
| WO | 2013138529 A1 | 9/2013 |
| WO | 2021213070 A1 | 10/2021 |

OTHER PUBLICATIONS

The State Intellectual Property Office of the People's Republic of China (SIPO) Office Action 1 for for 202010328532.3 Apr. 1, 2021 11 Pages (including translation).
The World Intellectual Property Organization (WIPO) International Search Report for PCT/CN2021/080690 Jun. 15, 2021 8 Pages (including translation).
Xiaomo Information, "I want to say that holding down the skill button and moving the steering wheel will drag the skill direction," Taptap.com, Oct. 11, 2018 (Oct. 11, 2018), Retrieved from the Internet: URL: https://www.taptap.com/video/1009192, [retrieved on Jan. 7, 2022]. 2 pages.
The Japan Patent Office (JPO) Notification of Reasons for Refusal for Application No. 2021-564351 and Translation Nov. 22, 2022 4 Pages.
Canadian Intellectual Property Office Application No. 3137791 Dec. 15, 2022 6 Pages.
Kazuma Sakurai, "Super Smash Bros. SPECIAL Official Guide 1st Edition", KADOKAWA Co., Ltd. Masayuki Aoyagi, Jan. 25, 2019, pp. 13, 16-23 12 Pages.
Korean Intellectual Property Office (KIPO) Request for the Submission of an Opinion for 20217036000 Nov. 1, 2023 26 Pages (including translation).
PERFECT Use of Mini Map | Map Awareness & FARMING Guide | MoBile Legends Bang Bang ', Internet YouTube Posting videos, (Mar. 24, 2019), <https://www.youtube.com/watch?v=jq35rGBhpns>.
The European Patent Office (EPO) The Extended European Search Report for 21782629.6 Jun. 20, 2022 11 pages.
Ed Krassenstein, "OnLive Brings Console-Class Games to Tablets & Phones: Gives Away a FREE Game—UPDATED," OnLiveFans. com, Jan. 9, 2012, Retrieved from the Internet: URL: https://web.archive.org/web/20120109143321/http://onlivefans.com/news/onlive-brings-console-class-games-to-tablets-phones-gives-away-a-free-game/5620/ [retrieved on May 30, 2022]. 2 pages.
Graham Mcallister, "A Guider to iOS Twin Stick Shooter Usability," Gamasutra.com, May 30, 2011, Retrieved from the Internet: URL: http://www.gamasutra.com/view/feature/6323/a-guide-to-ios-twin-stick-shooter-.php?print=1 [retrieved on Jun. 5, 2015]. 15 pages.
The Japan Patent Office (JPO) Notification of Reasons for Refusal for Application No. 2021-564351 and Translation Jun. 26, 2023 8 Pages.
[God game] Implosion play-by-play part 1, YouTube [online] [video], Sep. 9, 2016 URL:https://www.youtube.com/watch?v=LKOcerEtUMM> [searched Jun. 26, 2023] (newly cited literature).
An action equivalent to a game machine shall be satisfied. Implosion, Game Cast [online], Apr. 13, 2015 URL:http://www.gamecast-blog.com/archives/65825803.html>,(Newly cited document) [searched Jun. 26, 2023] (newly cited literature).

* cited by examiner

VIRTUAL CHARACTER CONTROL METHOD AND APPARATUS, DEVICE, AND STORAGE MEDIUM

CROSS-REFERENCES TO RELATED APPLICATIONS

This application is a continuation application of PCT Patent Application No. PCT/CN2021/080690, filed on Mar. 15, 2021, which claims priority to Chinese Patent Application No. 202010328532.3, entitled "VIRTUAL CHARACTER CONTROL METHOD AND APPARATUS, DEVICE, AND STORAGE MEDIUM" filed on Apr. 23, 2020, the entire contents of both of which are incorporated herein by reference.

FIELD OF THE TECHNOLOGY

Embodiments of the present disclosure relate to the field of virtual environments, and in particular, to a virtual character control method and apparatus, a device, and a storage medium.

BACKGROUND OF THE DISCLOSURE

A battle game is a game in which a plurality of user accounts contend against each other in the same virtual scene. Optionally, the battle game may be a multiplayer online battle arena (MOBA) game. A user can control a virtual object to cast a skill in the MOBA game to attack a hostile virtual object.

In the related art, skill cast includes at least two cast manners: quick cast and aiming cast. The quick cast means that, after triggering a cast control of a skill, a user casts the skill according to a current facing direction of a virtual object in a virtual environment.

However, during skill cast in the foregoing manners, when the user triggers quick cast of the skill while adjusting the facing direction of the virtual object by using a movement control, since the facing direction of the virtual object has not been updated, a direction in which the user expects to cast the skill is different from an actual direction in which the skill is cast. Consequently, the accuracy of skill cast is relatively low, and the user needs to perform cast again after cooling the skill, which leads to relatively low man-machine interaction efficiency.

SUMMARY

Embodiments of the present disclosure provide a virtual character control method and apparatus, a device, and a storage medium, which enables a user to improve the man-machine interaction efficiency during skill cast. The technical solutions are as follows:

According to an aspect, a virtual character control method is provided, performed by a computer device, the method including: displaying a virtual environment interface, the virtual environment interface including a screen obtained by observing a virtual environment, the screen including a main control virtual character in the virtual environment; receiving a skill cast operation and a movement control operation, the skill cast operation being used for controlling the main control virtual character to cast a directional skill in the virtual environment in a first direction, and the movement control operation being used for controlling the main control virtual character to move in a second direction in the virtual environment, the first direction and the second direction being independent of each other; and controlling, in response to the skill cast operation and the movement control operation, the main control virtual character to cast the directional skill in the virtual environment in the second direction.

According to another aspect, a virtual character control apparatus is provided, applicable to a computer device, the apparatus including: a display module, configured to display a virtual environment interface, the virtual environment interface including a screen obtained by observing a virtual environment, the screen including a main control virtual character in the virtual environment; a receiving module, configured to receive a skill cast operation and a movement control operation, the skill cast operation being used for controlling the main control virtual character to cast a directional skill in the virtual environment in a first direction, and the movement control operation being used for controlling the main control virtual character to move in a second direction in the virtual environment; and a cast module, configured to control, in response to the skill cast operation and the movement control operation, the main control virtual character to cast the directional skill in the virtual environment in the second direction.

According to another aspect, a computer device is provided, including a processor and a memory, the memory storing at least one instruction, at least one program, a code set, or an instruction set, the at least one instruction, the at least one program, the code set, or the instruction set being loaded and executed by the processor to implement: displaying a virtual environment interface, the virtual environment interface including a screen obtained by observing a virtual environment, the screen including a main control virtual character in the virtual environment; receiving a skill cast operation and a movement control operation, the skill cast operation being used for controlling the main control virtual character to cast a directional skill in the virtual environment in a first direction, and the movement control operation being used for controlling the main control virtual character to move in a second direction in the virtual environment, the first direction and the second direction being independent of each other; and controlling, in response to the skill cast operation and the movement control operation, the main control virtual character to cast the directional skill in the virtual environment in the second direction.

According to another aspect, a non-transitory computer-readable storage medium is provided, storing a computer program. The computer program, when being loaded and executed by a processor, cause the processor to perform: displaying a virtual environment interface, the virtual environment interface including a screen obtained by observing a virtual environment, the screen including a main control virtual character in the virtual environment; receiving a skill cast operation and a movement control operation, the skill cast operation being used for controlling the main control virtual character to cast a directional skill in the virtual environment in a first direction, and the movement control operation being used for controlling the main control virtual character to move in a second direction in the virtual environment, the first direction and the second direction being independent of each other; and controlling, in response to the skill cast operation and the movement control operation, the main control virtual character to cast the directional skill in the virtual environment in the second direction.

The technical solutions provided in the embodiments of the present disclosure achieve at least the following beneficial effects.

When a directional skill is cast, if a movement control operation is received, a second direction corresponding to the movement control operation is determined, and a main control virtual character is controlled to cast the directional skill in the second direction rather than in an automatically-selected first direction. Therefore, the directional skill is ensured to be cast in a facing direction of the main control virtual character after adjustment, which improves the accuracy of directional skill cast and avoids the problem of low man-machine interaction efficiency due to a wrong cast direction and a necessity to cast the directional skill again based on a re-operation of a user after the directional skill cools (that is, re-enters a releasable state after a period of recovery after cast), to improve man-machine interaction efficiency and reduce wrong operations requiring processing by a computer device, thereby improving overall performance of the computer device.

BRIEF DESCRIPTION OF THE DRAWINGS

To describe the technical solutions in the embodiments of the present disclosure more clearly, the accompanying drawings required for describing the embodiments are briefly described below. Apparently, the accompanying drawings in the following descriptions show merely some embodiments of the present disclosure, and a person of ordinary skill in the art may derive other drawings from these accompanying drawings without creative efforts.

DESCRIPTION OF EMBODIMENTS

Figure 1A:
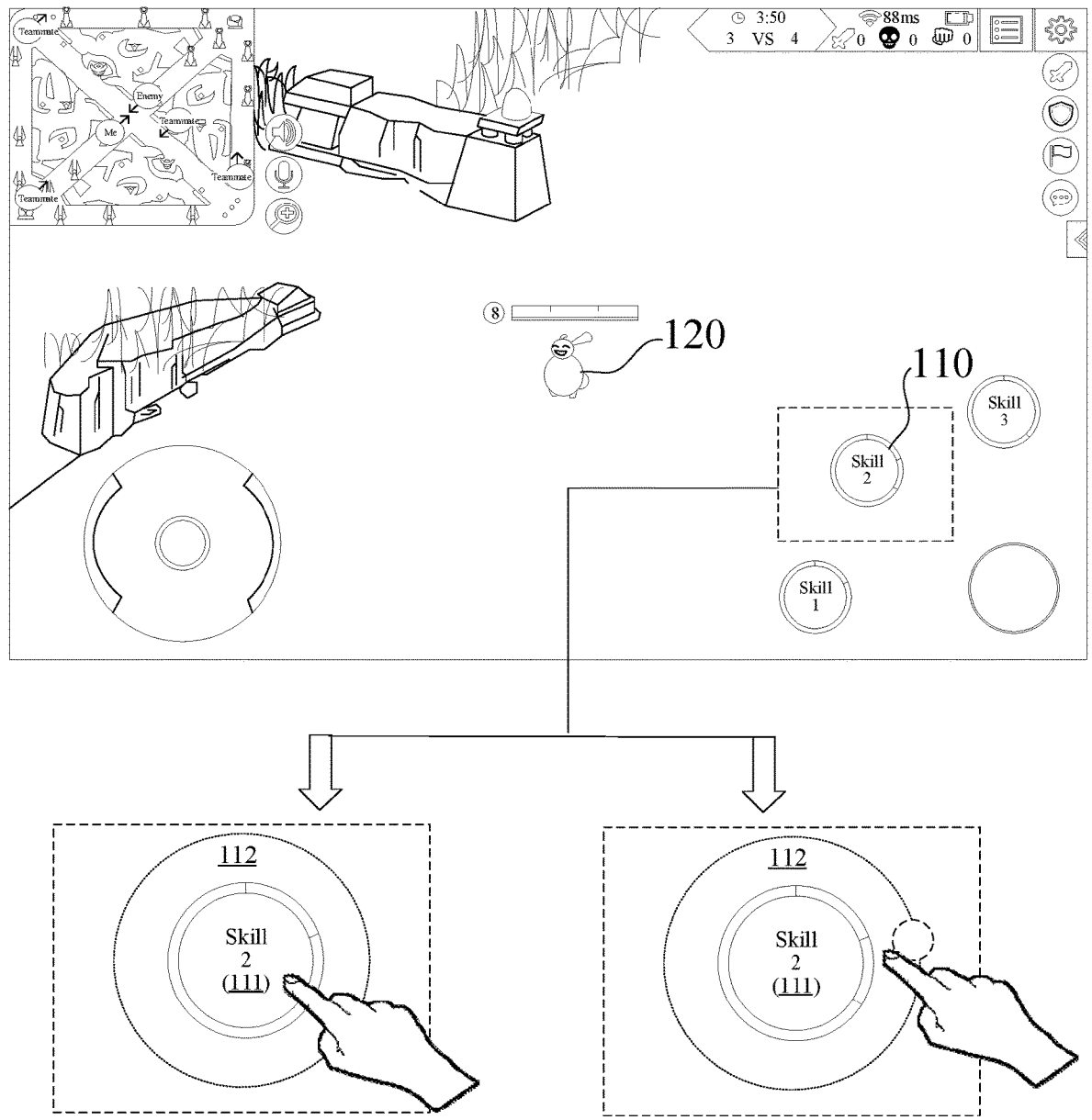
FIG. 1A and FIG. 1B are schematic interface diagrams of a skill cast process according to an exemplary embodiment of the present disclosure.

To make objectives, technical solutions, and advantages of the present disclosure clearer, the following further describes implementations of the present disclosure in detail with reference to the accompanying drawings.

First, terms involved in the embodiments of the present disclosure are briefly introduced:
1) Virtual Environment A virtual environment is displayed (or provided) by an application when run on a terminal. The virtual environment may be a simulated environment of a real world, or may be a semi-simulated semi-fictional environment, or may be an entirely fictional environment. The virtual environment may be any one of a two-dimensional (2D) virtual environment, a 2.5-dimensional (2.5D) virtual environment, and a three-dimensional (3D) virtual environment. This is not limited in the present disclosure. An example in which the virtual environment is a 3D virtual environment is used for description in the following embodiments. In some embodiments, the virtual environment is used for providing a combat environment for at least two main control virtual characters. The virtual environment includes a lower left corner region and an upper right corner region that are symmetrical. Main control virtual characters belonging to two hostile camps occupy the regions respectively, and the objective of each side is to destroy a target building, a fort, a base, or a crystal deep in the opponent's region to win victory.
2) Virtual Character A virtual character refers to a movable object in a virtual environment. The movable object may be a virtual person, a virtual animal, a cartoon person, or the like, such as a person or an animal displayed in a 3D virtual environment. Optionally, the virtual character is a 3D model created based on a skeletal animation technology. Each virtual character has a respective shape and size in the 3D virtual environment, and occupies some space in the 3D virtual environment. An example in which the virtual character is a main control virtual character controlled by a user is used in the embodiments of the present disclosure. The main control virtual character generally refers to one or more main control virtual characters in the virtual environment.
3) MOBA Game A MOBA game is an arena in which different virtual teams belonging to at least two hostile camps occupy respective map regions in a virtual environment, and contend against each other using specific victory conditions as goals. The victory conditions include, but are not limited to at least one of occupying forts or destroying forts of the hostile camps, killing virtual characters in the hostile camps, ensuring self-survivals in a specified scene and time, seizing a specific resource, and outscoring the opponent within a specified time. The battle arena may take place in rounds, and a map of each round of the battle arena may be the same or different. Each virtual team includes one or more virtual characters, such as 1 virtual character, 2 virtual characters, 3 virtual characters, or 5 virtual characters. A duration of one round of the MOBA game is from a moment at which the game starts to a moment at which the victory condition is met.

A method provided in the present disclosure may be applied to a virtual reality (VR) application, a 3D map program, a military simulation program, a first person shooting (FPS) game, a MOBA game, and the like. An application in a game is used as an example for description in the following embodiments.

A game based on a virtual environment includes one or more game worlds. The virtual environment in the game may simulate scenes in the real world. A user may control a main control virtual character in the game to perform actions in the virtual environment such as walking, running, jumping, shooting, combating, driving, casting skills, being attacked by another virtual character, being injured in the virtual environment, and attacking another virtual character, which has relatively high interactivity. In addition, a plurality of users may form a team online to perform an arena game.

In some embodiments, the main control virtual character casts a skill in a virtual environment in at least one of the following skill cast manners.

The first manner is quick cast, which means, during skill cast, a skill is cast in a facing direction of a virtual object in the virtual environment by triggering a skill cast control.

Optionally, the skill cast control corresponds to a first region and a second region. When a first trigger operation in the first region is received, a directional skill is cast in the virtual environment in a first direction. The first direction is the facing direction of the virtual object, or a direction corresponding to a position of a target to be attacked within a skill cast range. Optionally, when the first trigger operation is received and there is no target to be attacked in a preset range around the virtual object, the skill is cast in the facing direction of the virtual object in the virtual environment. The first trigger operation in the first region includes a touch operation acting on the skill cast control, and an end position of the touch operation is located in the first region, or the first trigger operation in the first region includes a touch operation acting on the first region, and the touch operation does not move out of the first region.

The second manner is aiming cast, which means, during skill cast, a skill cast direction is adjusted by using the skill cast control, and then a skill is cast in an adjusted direction.

Optionally, when a second trigger operation in a second region is received, the skill cast direction is determined according to the second trigger operation, and when the trigger operation ends, the skill is cast in the skill cast direction. The second trigger operation in the second region includes a touch operation acting on and starting in the first region, and an end position of the touch operation is located in the second region, or, the second trigger operation in the second region includes a touch operation acting on the second region, and the touch operation does not move out of the second region.

Figure 1B:
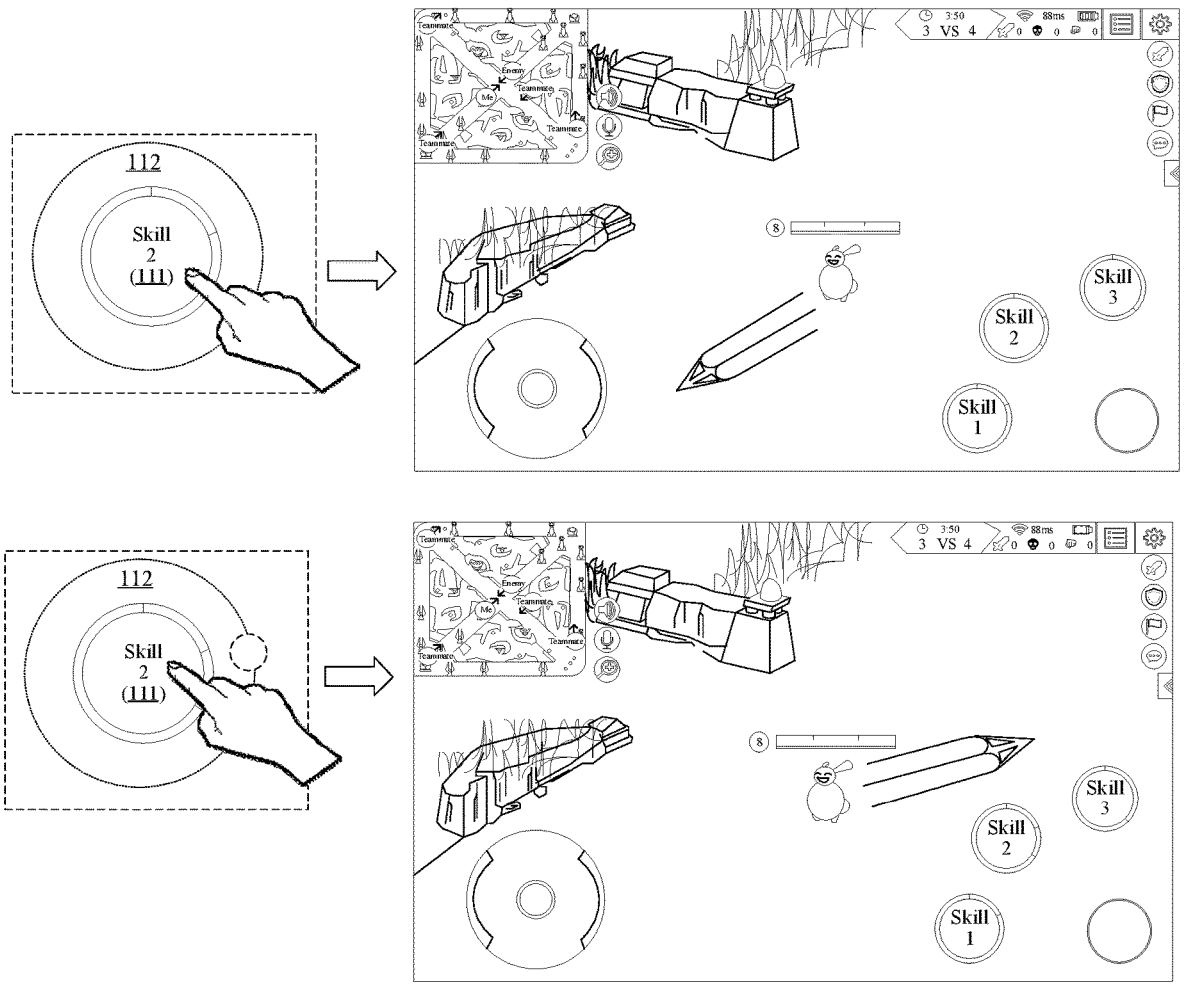

For example, FIG. 1A and FIG. 1B are schematic interface diagrams of a skill cast process according to an exemplary embodiment of the present disclosure. As shown in FIG. 1A, a virtual environment interface 100 includes a skill cast control 110. The skill cast control 110 includes a first region 111 and a second region 112. The skill cast process implemented based on the skill cast control 110 in FIG. 1A is shown in FIG. 1B. In response to a skill cast operation received in the first region 111, a skill is cast in a facing direction of a virtual object 120 in a virtual environment. In response to a skill cast operation received in the second region 112, a cast direction corresponding to the skill cast operation is determined, and the skill is cast in the cast direction.

In an embodiment of the present disclosure, a skill cast manner of the foregoing quick cast is described.

A virtual environment interface further includes a movement joystick, configured to control the facing direction of the virtual object and control the virtual object to move in the virtual environment. The movement joystick may be a virtual control that responds to user gestures/operations (e.g., touch gesture on control 630 shown in FIG. 6). When the movement joystick receives a control operation and changes the facing direction of the virtual object, when receiving a quick cast operation on the skill cast control, a mobile terminal obtains the facing direction of the virtual object from a logic layer, and quickly casts the skill in the facing direction. However, in an environment with a relatively poor network, no feedback message is received after the control operation received by the movement joystick is uploaded to a server. That is, the virtual object has not finished adjusting the facing direction at the logic layer. The facing direction obtained by a client from the logic layer is the direction before adjustment. Consequently, the cast direction in which the skill is cast is different from a facing direction after adjustment, resulting in relatively low accuracy of the skill cast direction.

Figure 2:
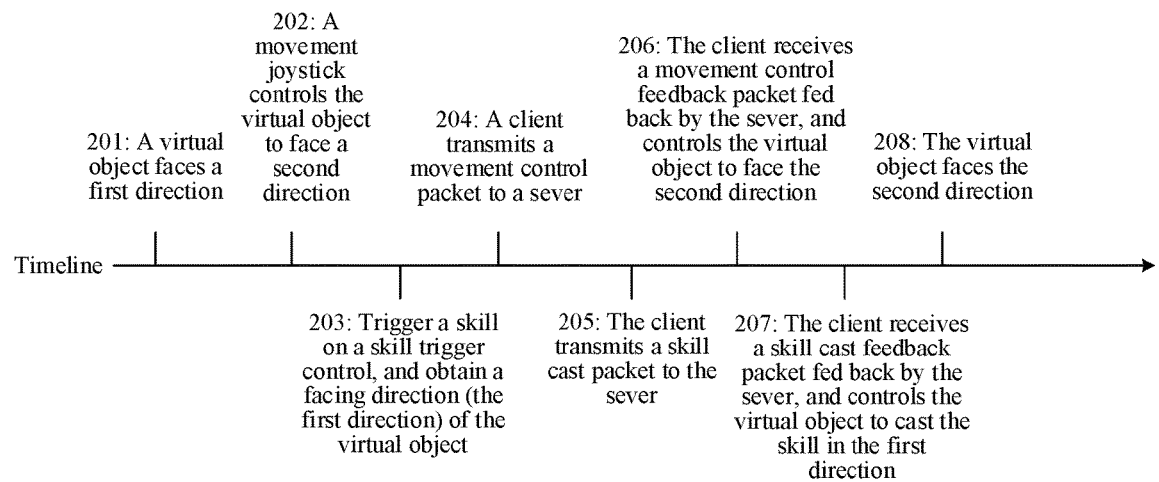
FIG. 2 is a schematic timeline diagram of quick cast of a skill in the related art.

For example, referring to FIG. 2, on the timeline, the skill cast process includes the following steps:

Step 201. A virtual object faces a first direction.
Step 202. A movement joystick controls the virtual object to face a second direction.
Step 203. Trigger a skill on a skill trigger control, and obtain a facing direction (the first direction) of the virtual object.
Step 204. A client transmits a movement control packet to a server.
Step 205. The client transmits a skill cast packet to the server.
Step 206. The client receives a movement control feedback packet fed back by the server, and controls the virtual object to face the second direction.
Step 207. The client receives a skill cast feedback packet fed back by the server, and controls the virtual object to cast the skill in the first direction.
Step 208. The virtual object faces the second direction.

That is, there is a time difference between controlling the virtual object to face the second direction and obtaining the direction from the logic layer for skill cast. Consequently, a skill cast direction is not accurate since the direction obtained from the logic layer is the first direction before updating.

Figure 3:
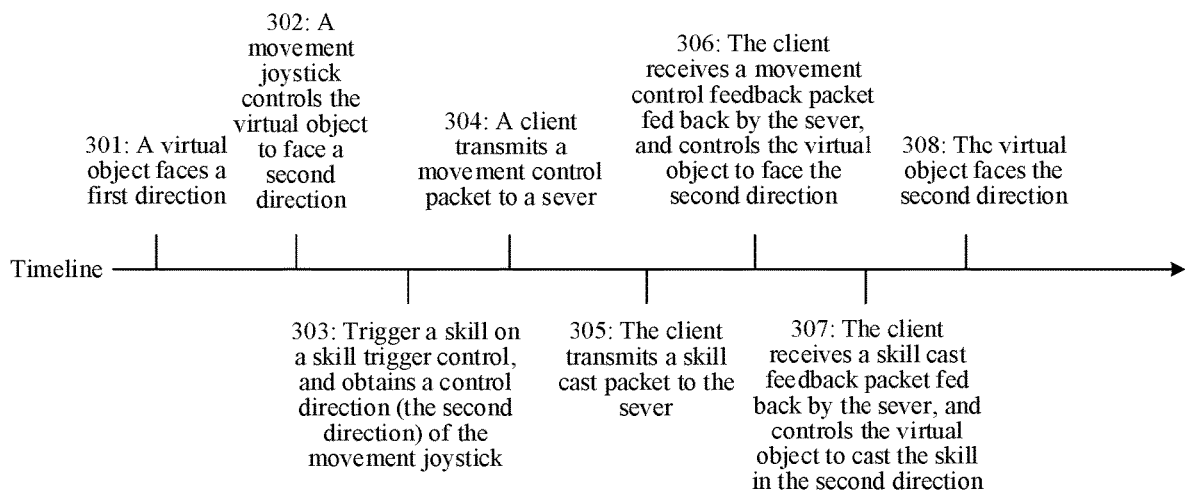
FIG. 3 is a schematic timeline diagram of quick cast of a skill according to an exemplary embodiment of the present disclosure.

In this embodiment of the present disclosure, referring to FIG. 3, on the timeline, the skill cast process includes the following steps:

Step 301. A virtual object faces a first direction.
Step 302. A movement joystick controls the virtual object to face a second direction.
Step 303. Trigger a skill on a skill trigger control, and obtains a control direction (the second direction) of the movement joystick.
Step 304. A client transmits a movement control packet to a server.
Step 305. The client transmits a skill cast packet to the server.
Step 306. The client receives a movement control feedback packet fed back by the server, and controls the virtual object to face the second direction.

Step 307. The client receives a skill cast feedback packet fed back by the server, and controls the virtual object to cast the skill in the second direction.

Step 308. The virtual object faces the second direction.

That is, during the skill cast process, an obtained cast direction is the control direction received on a movement control, that is, a final facing direction of the virtual object, thereby improving the accuracy of the skill cast direction.

Figure 4:
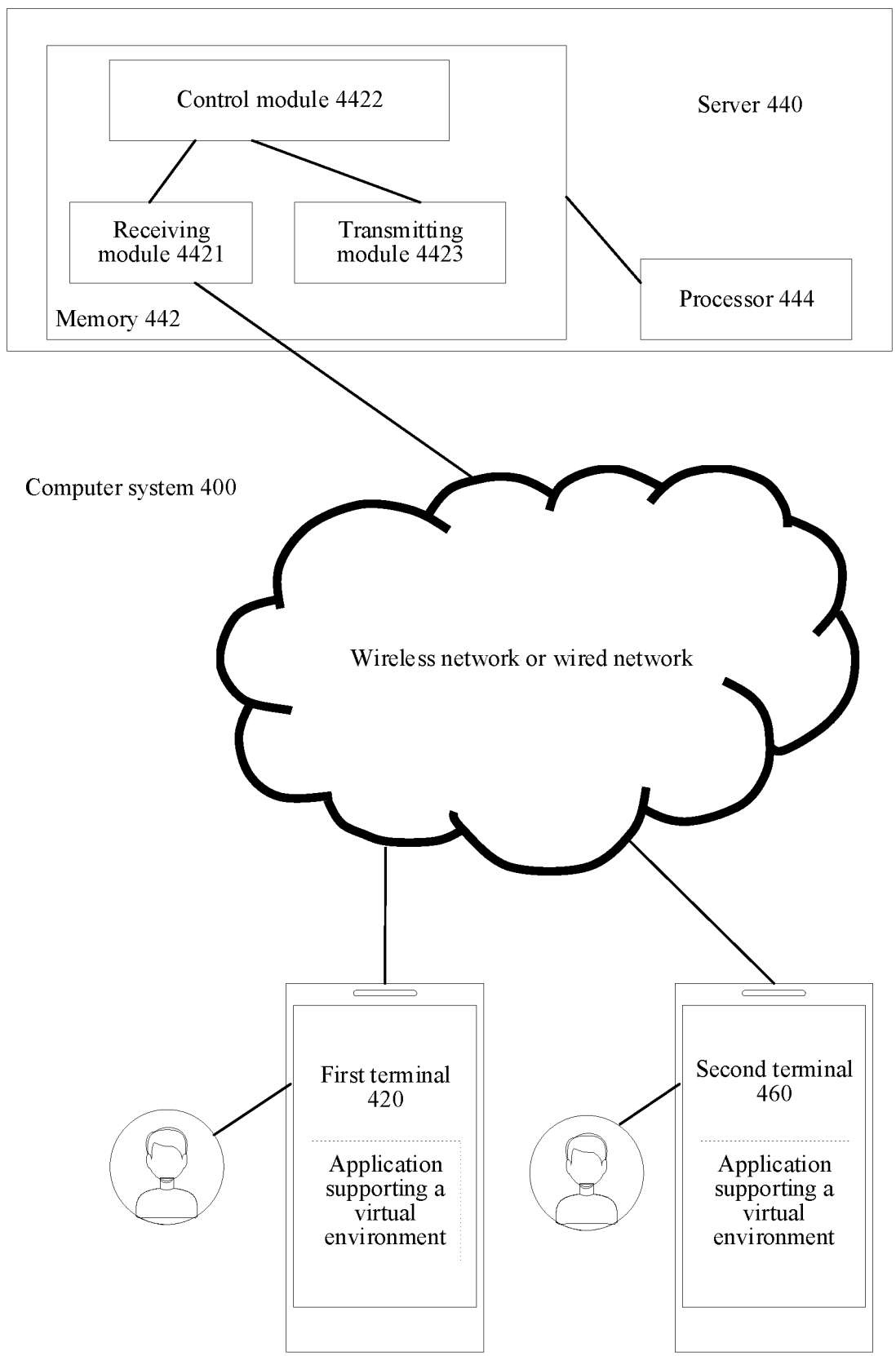
FIG. 4 is a structural block diagram of a computer system according to an exemplary embodiment of the present disclosure.

FIG. 4 is a structural block diagram of a computer system according to an exemplary embodiment of the present disclosure. The computer system 400 includes a first terminal 420, a server 440, and a second terminal 460.

An application supporting a virtual environment is installed and run on the first terminal 420. The application may be any one of a VR application, a 3D map program, a military simulation program, an FPS game, a MOBA game, a multiplayer gunfight survival game, and a battle royale shooting game. The first terminal 420 is a terminal used by a first user. The first user uses the first terminal 420 to control a first main control virtual character in the virtual environment to perform a movement. The movement includes, but is not limited to, at least one of body posture adjustment, walking, running, jumping, casting a skill, picking-up, attacking, and avoiding an attack from another virtual character. For example, the first main control virtual character is a first virtual person, such as a simulated person character or a cartoon person character. For example, the first main control virtual character casts a regional skill in the virtual environment. A virtual environment screen moves from a position at which the main control virtual character is located to a target region selected by a regional skill indicator. The regional skill indicator is configured to indicate a skill cast region corresponding to a case that the main control virtual character casts the skill.

The first terminal 420 is connected to the server 440 by using a wireless network or a wired network.

The server 440 includes at least one of a server, a plurality of servers, a cloud computing platform, and a virtualization center. For example, the server 440 includes a processor 444 and a memory 442. The memory 442 further includes a receiving module 4421, a control module 4422, and a transmitting module 4423. The receiving module 4421 is configured to receive a request transmitted by a client, such as a team-up request. The control module 4422 is configured to control rendering of the virtual environment screen. The transmitting module 4423 is configured to transmit a message notification to the client, such as a team-up success notification. The server 440 is configured to provide a backend service for the application supporting a 3D virtual environment. Optionally, the server 440 takes on primary computing work, and the first terminal 420 and the second terminal 460 take on secondary computing work; alternatively, the server 440 takes on secondary computing work, and the first terminal 420 and the second terminal 460 take on primary computing work; alternatively, collaborative computing is performed by using a distributed computing architecture among the server 440, the first terminal 420, and the second terminal 460.

The second terminal 460 is connected to the server 440 by using a wireless network or a wired network.

An application supporting a virtual environment is installed and run on the second terminal 460. The application may be any one of a VR application, a 3D map program, a military simulation program, an FPS game, a MOBA game, a multiplayer gunfight survival game, and a battle royale shooting game. The second terminal 460 is a terminal used by a second user. The second user uses the second terminal 460 to control a second main control virtual character in the virtual environment to perform a movement. The movement includes, but is not limited to, at least one of body posture adjustment, walking, running, jumping, casting a skill, picking-up, attacking, and avoiding an attack from another main control virtual character. For example, the second main control virtual character is a second virtual person, such as a simulated person character or a cartoon person character.

Optionally, a first virtual person character and a second virtual person character are in the same virtual environment. Optionally, the first virtual person character and the second virtual person character may belong to the same team or the same organization, have a friend relationship, or have a temporary communication permission.

Optionally, the applications installed on the first terminal 420 and the second terminal 460 are the same, or the applications installed on the two terminals are the same type of applications on different control system platforms. The first terminal 420 may generally refer to one of a plurality of terminals, and the second terminal 460 may generally refer to one of a plurality of terminals. In this embodiment, only the first terminal 420 and the second terminal 460 are used as an example for description. Device types of the first terminal 420 and the second terminal 460 are the same or different. The device types include at least one of a smart phone, a tablet computer, an e-book reader, a moving picture experts group audio layer III (MP3) player, a moving picture experts group audio layer IV (MP4) player, a laptop computer, and a desktop computer. The following embodiment is described by using an example in which the terminal includes a smart phone.

A person skilled in the art may learn that there may be more or fewer terminals. For example, there may be only one terminal, dozens of or hundreds of terminals, or more. The quantities and the device types of the terminals are not limited in the embodiments of the present disclosure.

Figure 5:
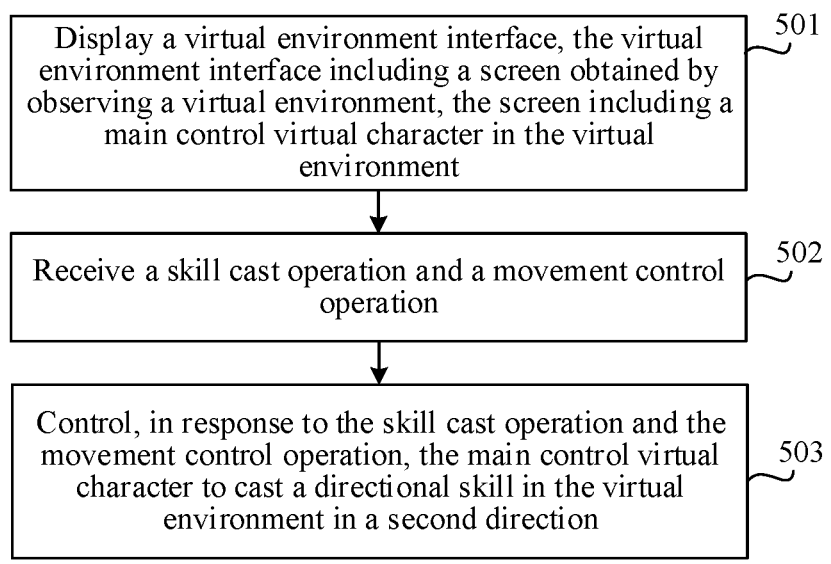
FIG. 5 is a flowchart of a virtual character control method according to an exemplary embodiment of the present disclosure.

FIG. 5 is a flowchart of a virtual character control method according to an exemplary embodiment of the present disclosure. The method may be performed by a computer device. The computer device may be implemented as the first terminal 420 or the second terminal 460 in a computer system 400 shown in FIG. 4 or another terminal in the computer system 400. As shown in FIG. 5, the method includes the following steps:

Step 501. Display a virtual environment interface, the virtual environment interface including a screen obtained by observing a virtual environment, the screen including a main control virtual character in the virtual environment.

Optionally, the virtual environment interface further includes a cast control configured to control the main control virtual character to cast a directional skill, and a movement control configured to control the main control virtual character to move in the virtual environment.

Optionally, the screen includes the main control virtual character in the virtual environment. An application supporting a virtual environment is run on a terminal used by a user. When the user runs the application, a display screen of the terminal correspondingly displays a user interface of the application during use, that is, the virtual environment interface. The virtual environment interface displays a screen obtained by observing the virtual environment from a target observation position. The virtual environment displayed on the screen includes at least one of the following elements: mountains, flatlands, rivers, lakes, oceans, deserts, sky, plants, buildings, and vehicles.

In some embodiments, the virtual environment is in an arbitrary boundary shape. For example, the virtual environment is rhombic. The user can scan an overall perspective of the virtual environment by viewing a map corresponding to the virtual environment. The virtual environment is provided with a camera model. The camera model is configured to observe the virtual environment from different perspectives, so as to obtain a virtual environment screen.

A perspective refers to an observation angle at which observation is performed in a virtual environment from a first-person perspective or a third-person perspective of a main control virtual character.

Optionally, the virtual environment interface displays the cast control configured to control the main control virtual character to cast the directional skill. The directional skill corresponds to a skill cast direction. That is, during skill cast, the directional skill needs to be cast in a specified direction. The skill cast direction includes at least one of the following two situations:

The first one is to control the main control virtual character to cast the directional skill in a first direction during quick cast of the directional skill. For example, when no attack object in a preset range around the virtual object, a facing direction of the virtual object in the virtual environment is used as the cast direction of the directional skill. When an attack object being in the preset range around the virtual object, a direction corresponding to the attack object is used as the cast direction of the directional skill.

The second is to adjust the cast direction of the directional skill by using a cast adjustment operation on the cast control during aiming cast of the directional skill. After triggering the cast, the directional skill is cast in an adjusted cast direction.

In an embodiment of the present disclosure, explanation is provided for the quick cast process of the directional skill. That is, explanation is provided for a skill cast manner of obtaining a facing direction of the main control virtual character in the virtual environment and casting the directional skill in the facing direction during casting of the directional skill.

Optionally, the virtual environment interface further displays a movement control configured to control the main control virtual character to move. In a process of controlling the main control virtual character to move, the movement control may be further configured to control the main control virtual character to adjust a movement direction. That is, the user can adjust the facing direction of the main control virtual character by using the movement control, and control the main control virtual character to move in the facing direction in the virtual environment.

Optionally, during casting of the directional skill, a manner of quick cast can improve efficiency of skill cast. Generally, when the user casts the skill, after quickly adjusting the facing direction of the main control virtual character by using the movement control, the directional skill is quickly cast in an accurate direction by using a skill cast operation on the directional skill.

Step 502. Receive the skill cast operation and a movement control operation.

Optionally, the skill cast operation is used for controlling the main control virtual character to cast the directional skill in the virtual environment in the first direction. The movement control operation is used for controlling the main control virtual character to move in a second direction in the virtual environment. The first direction and the second direction are independent of each other. In some embodiments, the skill cast operation and the movement control operation are received simultaneously or substantially at the same time (e.g., within 0.5 second). For example, the computer device can determine a current state of a movement control at the same time of receiving the skill cast operation. The current state of the movement control may be adjusted according to the movement operation performed on the movement control at substantially the same time of receiving the skill cast operation.

Optionally, the skill cast operation corresponds to quick cast of the directional skill. That is, the main control virtual character is controlled by using the skill cast operation to cast the directional skill in the manner of quick cast. The first direction is a direction automatically selected by the client during casting of the directional skill. For example, when an attack object being in a preset range around the main control virtual character, a direction corresponding to a position at which the attack object is located is used as the first direction. When no attack object in the preset range around the main control virtual character, the facing direction of the main control virtual character is used as the first direction.

Figure 6:
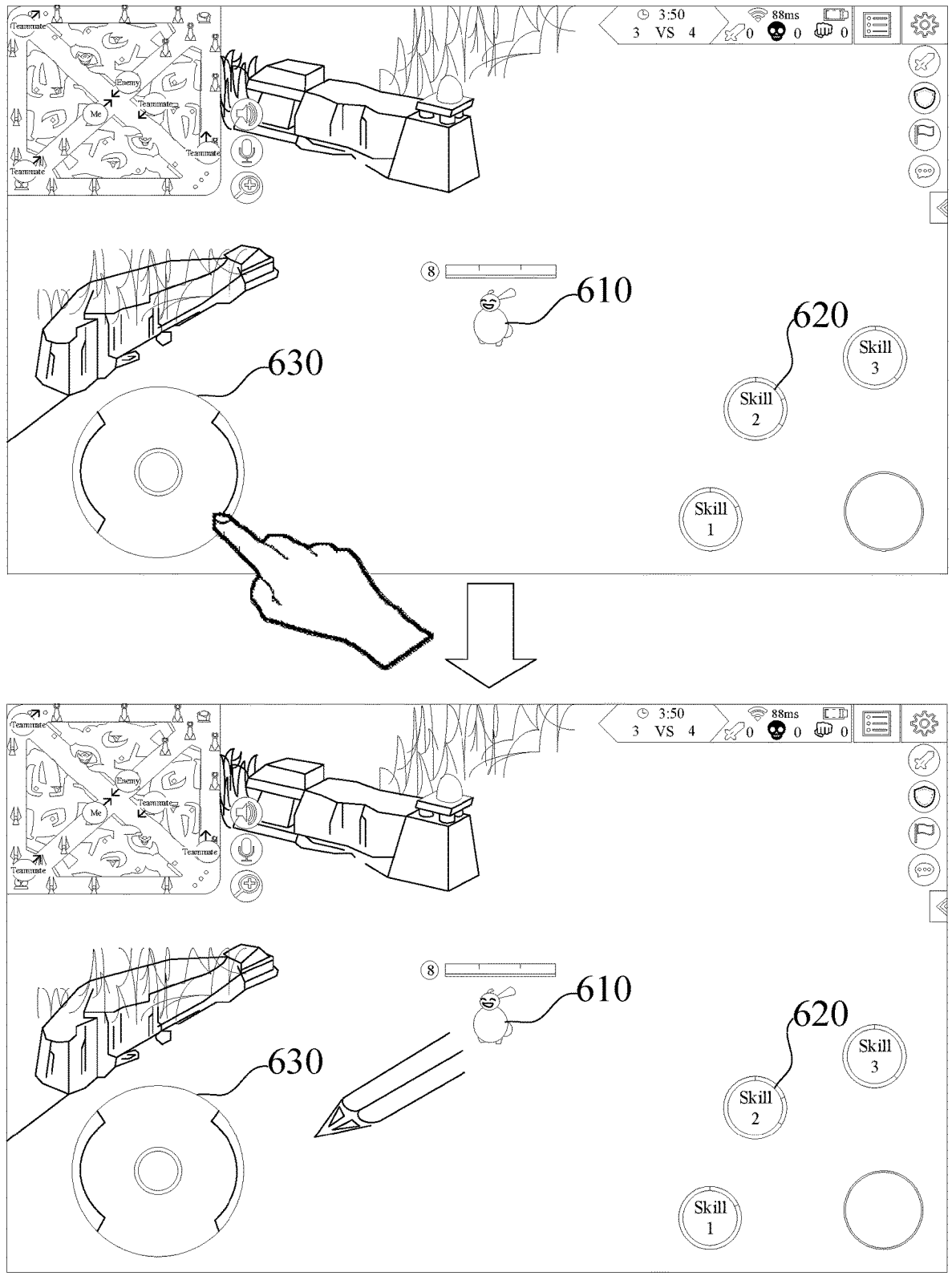
FIG. 6 is a schematic interface diagram of skill cast and movement control according to the embodiment shown in FIG. 5.

The facing direction of the main control virtual character used as the first direction is used as an example for explanation in this embodiment of the present disclosure. Optionally, a manner of obtaining the facing direction includes directly obtaining a current orientation of the main control virtual character in the virtual environment from a logic layer as the facing direction of the main control virtual character. However, the facing direction obtained from the logic layer may be inaccurate due to delay of direction adjustment, causing the skill cast direction to be inaccurate. As shown in FIG. 6, a virtual environment interface 600 includes a main control virtual character 610, a skill cast control 620, and a movement control 630. The movement control 630 receives a drag operation toward a lower right corner, and controls the main control virtual character 610 to face a direction corresponding to the lower right corner and move in the direction corresponding to the lower right corner. The skill cast control 620 receives a quick cast operation, and the main control virtual character 610 currently faces a direction corresponding to a lower left corner. Therefore, the skill cast direction included in a skill cast request transmitted by the terminal to a server corresponds to the lower left corner, and a skill is cast toward the lower left corner, which is different from the direction controlled on the movement control 630.

In this embodiment of the present disclosure, the first direction is replaced with the second direction corresponding to the movement control operation for casting the directional skill. That is, the second direction corresponding to the movement control operation is obtained from a presentation layer as the facing direction of the main control virtual character. Optionally, the virtual environment interface further includes the movement control, and the movement control operation is the drag operation received on the movement control, so that after the drag operation on the movement control is received, a drag direction of the drag operation is obtained from the presentation layer, and the second direction to which the main control virtual character corresponds during movement is determined according to the drag direction.

Optionally, the movement control operation is an operation triggered based on the movement control. The presentation layer is configured to present the interface and receive an interface operation. For example, the presentation layer is configured to display a screen corresponding to the virtual environment in the virtual environment interface and a control for controlling the main control virtual character or a game process. Optionally, the presentation layer is further configured to receive a touch operation on the virtual environment interface, and report the touch operation to the logic layer by using the server for logic processing.

Optionally, both the presentation layer and the logic layer exist in a game client. The logic layer cannot directly access data at the presentation layer. The presentation layer can access data at the logic layer. However, the presentation layer cannot modify logic at the logic layer. The logic processing needs to be performed by using the server at the logic layer according to the received touch operation.

Optionally, during the movement control operation, the user performs the touch operation on the movement control in the virtual environment interface, so that the presentation layer reads touch data and generates a movement touch message. For example, the movement touch message includes the facing direction of the main control virtual character after adjustment. The client transmits the movement touch message to the server. After the server transmits a movement feedback message to the logic layer of the client, the logic layer adjusts the facing direction of the main control virtual character according to the movement feedback message. The presentation layer reads an adjusted facing direction from the logic layer for presentation, thereby implementing control over the main control virtual character.

Optionally, the virtual environment interface further includes the skill cast control. The skill cast control is configured to control the virtual object to cast the directional skill. Optionally, the skill cast control corresponds to the first region and the second region. The first region is used for triggering the quick cast of the directional skill. The second region is used for triggering the aiming cast of the directional skill. Optionally, for the first region, in response to receiving a first trigger operation in the first region of the skill cast control, reception of the skill cast operation is determined. When receiving the first trigger operation in the first region of the skill cast, the quick cast is performed on the directional skill. Optionally, when receiving a second trigger operation in the second region of the skill cast control, the cast direction corresponding to the second trigger operation is determined. The main control virtual character is controlled to cast the directional skill in the corresponding cast direction in the virtual environment. The second region is a region corresponding to the skill cast control other than the first region.

Step 503. Control, in response to the skill cast operation and the movement control operation, the main control virtual character to cast the directional skill in the virtual environment in the second direction.

Optionally, the second direction is a direction corresponding to the movement control operation, and the adjusted facing direction when the user controls the main control virtual character to adjust the facing direction. In this way, the cast direction of the directional skill is consistent with a movement control direction.

A skill cast control is usually set to perform next skill cast based on the skill cast control following a specific period of time after performing skill cast based on the skill cast control. That is, after a skill is cast, the skill can only be cast again after skill cooling. Therefore, based on the virtual character control method provided in this embodiment of the present disclosure, the waste of skill cast time caused by a wrong cast direction of the directional skill can be reduced, thereby improving man-machine interaction efficiency.

Based on the above, in the virtual character control method provided in this embodiment of the present disclosure, when the directional skill is cast, if the movement control operation is received, the second direction corresponding to the movement control operation is determined, and the main control virtual character is controlled to cast the directional skill in the second direction rather than in the automatically-selected first direction. Therefore, the directional skill is ensured to be cast in the facing direction of the main control virtual character after adjustment, which improves the accuracy of the directional skill cast and avoids the problem of low man-machine interaction efficiency due to a wrong cast direction and a necessity to cast the directional skill again based on a re-operation of the user after the directional skill cools (that is, re-enters a releasable state after a period of recovery after cast), to improve man-machine interaction efficiency and reduce wrong operations requiring processing by a computer device, thereby improving overall performance of the computer device.

Figure 7:
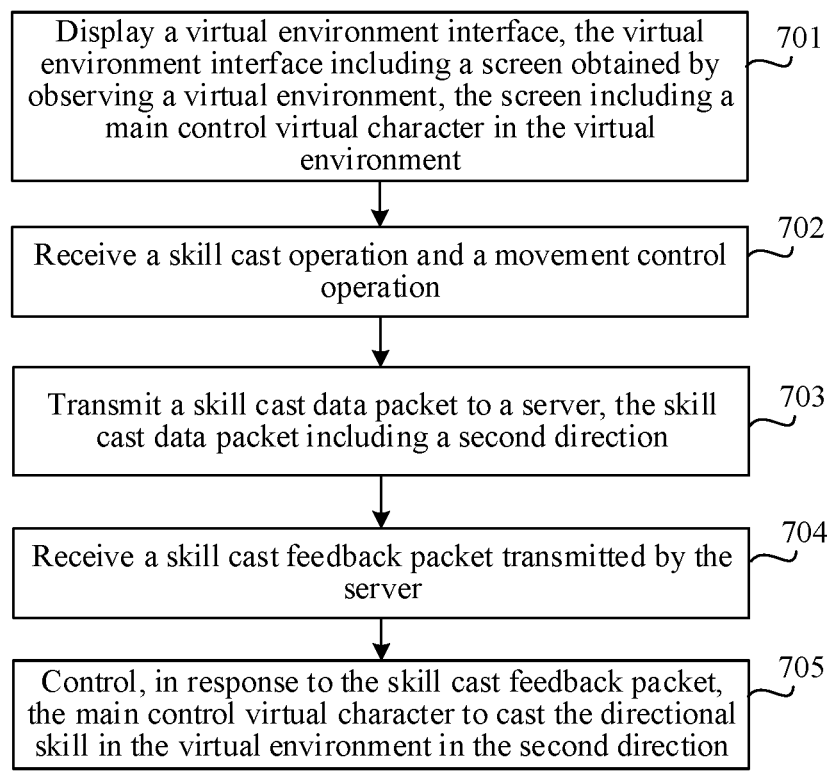
FIG. 7 is a flowchart of a virtual character control method according to another exemplary embodiment of the present disclosure.

In some embodiments, when controlling the main control virtual character to cast the directional skill, a skill cast process at the logic layer needs to be implemented by using the server. FIG. 7 is a flowchart of a virtual character control method according to another exemplary embodiment of the present disclosure. The method may be performed by a computer device. The computer device may be implemented as the first terminal 420 or the second terminal 460 in the computer system 400 shown in FIG. 4 or another terminal in the computer system 400. As shown in FIG. 7, the method includes the following steps:

Step 701. Display a virtual environment interface, the virtual environment interface including a screen obtained by observing a virtual environment, the screen including a main control virtual character in the virtual environment.

Optionally, the screen superimposes a cast control configured to control the main control virtual character to cast a directional skill, and a movement control configured to control the main control virtual character to move in the virtual environment.

Optionally, to distinguish from correspondingly using the first direction as the cast direction of the skill during the quick cast of the directional skill, in this embodiment of the present disclosure, during the quick cast of the directional skill, a facing direction of the main control virtual character in the virtual environment is obtained, and the directional skill is cast in the facing direction of the main control virtual character.

Step 702. Receive a skill cast operation and a movement control operation.

Optionally, the skill cast operation is used for controlling the main control virtual character to cast the directional skill in the virtual environment in a first direction. The movement control operation is used for controlling the main control virtual character to move in the virtual environment in a second direction. The first direction and the second direction are independent of each other.

Optionally, the skill cast operation corresponds to quick cast of the directional skill. That is, the main control virtual character is controlled by using the skill cast operation to cast the directional skill in the manner of quick cast.

Optionally, the movement control operation is an operation triggered by using the movement control. The second direction corresponding to the movement control operation is obtained from a presentation layer according to the movement control operation. The presentation layer is configured to present the interface and receive the interface operation.

Optionally, the movement control operation is implemented by a drag operation on the movement control. That is, the drag operation on the movement control is received, a drag direction of the drag operation is obtained from the presentation layer, and the second direction to which the main control virtual character corresponds during movement is determined according to the drag direction.

Step 703. Transmit a skill cast data packet to a server, the skill cast data packet including the second direction.

Optionally, the presentation layer can access data at a logic layer, but cannot modify the logic at the logic layer, that is, cannot control the logic layer to perform logic processing. Therefore, after obtaining the second direction, the presentation layer transmits the skill cast data packet to the server. The skill cast data packet includes using the second direction as the cast direction of the directional skill.

Step 704. Receive a skill cast feedback packet transmitted by the server.

Optionally, the skill cast feedback packet transmitted by the server is received by the logic layer, and logic processing is performed by the logic layer according to the skill cast feedback packet.

Step 705. Control, in response to the skill cast feedback packet, the main control virtual character to cast the directional skill in the virtual environment in the second direction.

Optionally, after receiving the skill cast feedback packet, the logic layer controls, according to control data in the skill cast feedback packet, the main control virtual character to cast the directional skill in the virtual environment in the second direction.

Optionally, the second direction is the direction corresponding to the movement control operation received on the movement control, and the adjusted facing direction when the user controls the main control virtual character to adjust the facing direction. In this way, the cast direction of the directional skill is consistent with the movement control direction.

Figure 8:
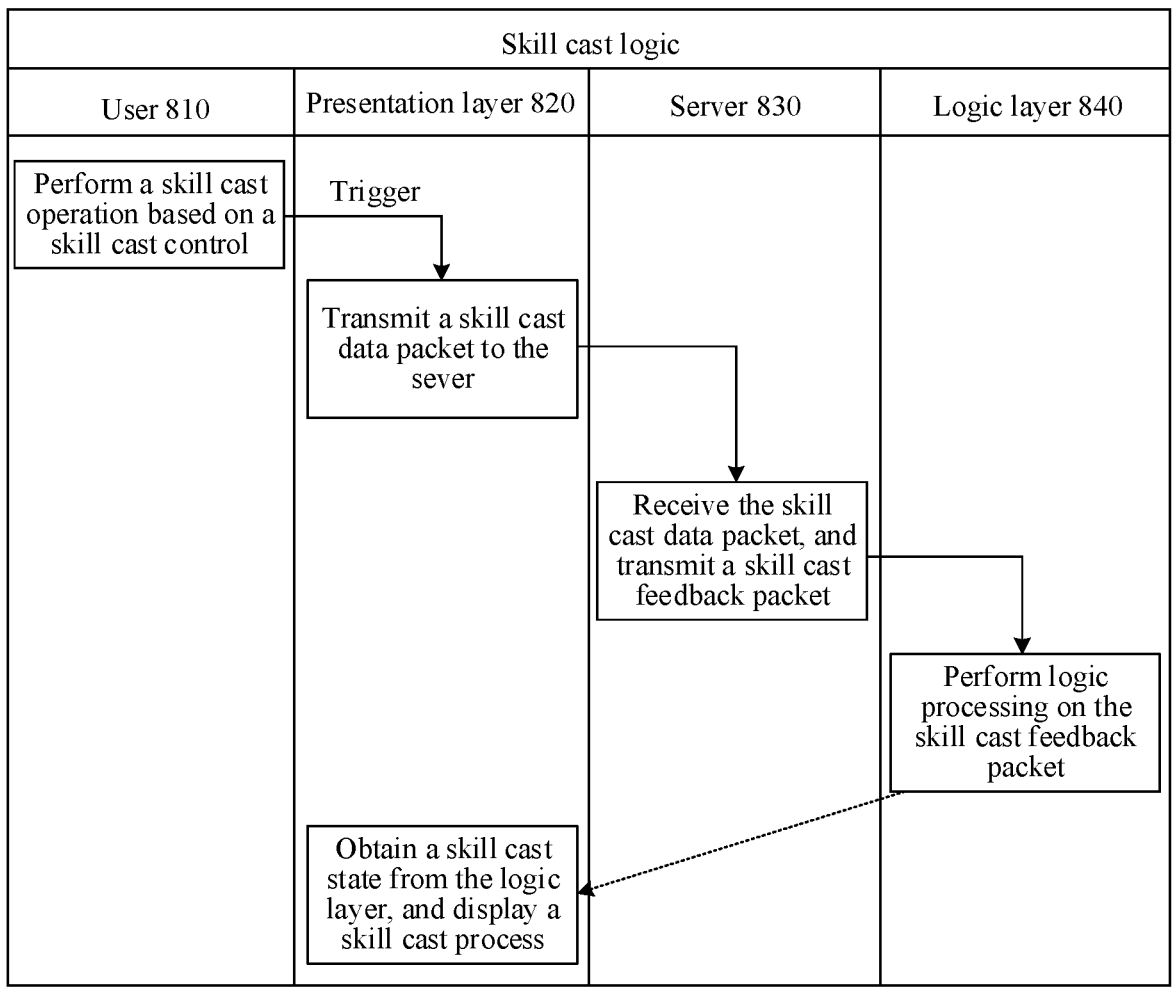
FIG. 8 is a flowchart of a skill cast process according to the embodiment shown in FIG. 7.

For example, explanation is provided for skill cast logic in conjunction with the user, the presentation layer, the server, and the logic layer. As shown in FIG. 8, first, after a user 810 performs a skill cast operation based on a skill cast control, a presentation layer 820 is triggered to transmit a skill cast data packet to a server 830. The skill cast data packet includes a movement control direction. After receiving the skill cast data packet, the server 830 transmits a skill cast feedback packet to a logic layer 840. The logic layer 840 performs logic processing based on the skill cast feedback packet, and transmits a skill cast state to the presentation layer 820 to instruct the presentation layer 820 to display the skill cast process. Correspondingly, the presentation layer 820 obtains the skill cast state from the logic layer 840, and the skill cast process is displayed at the presentation layer 820.

Figure 9:
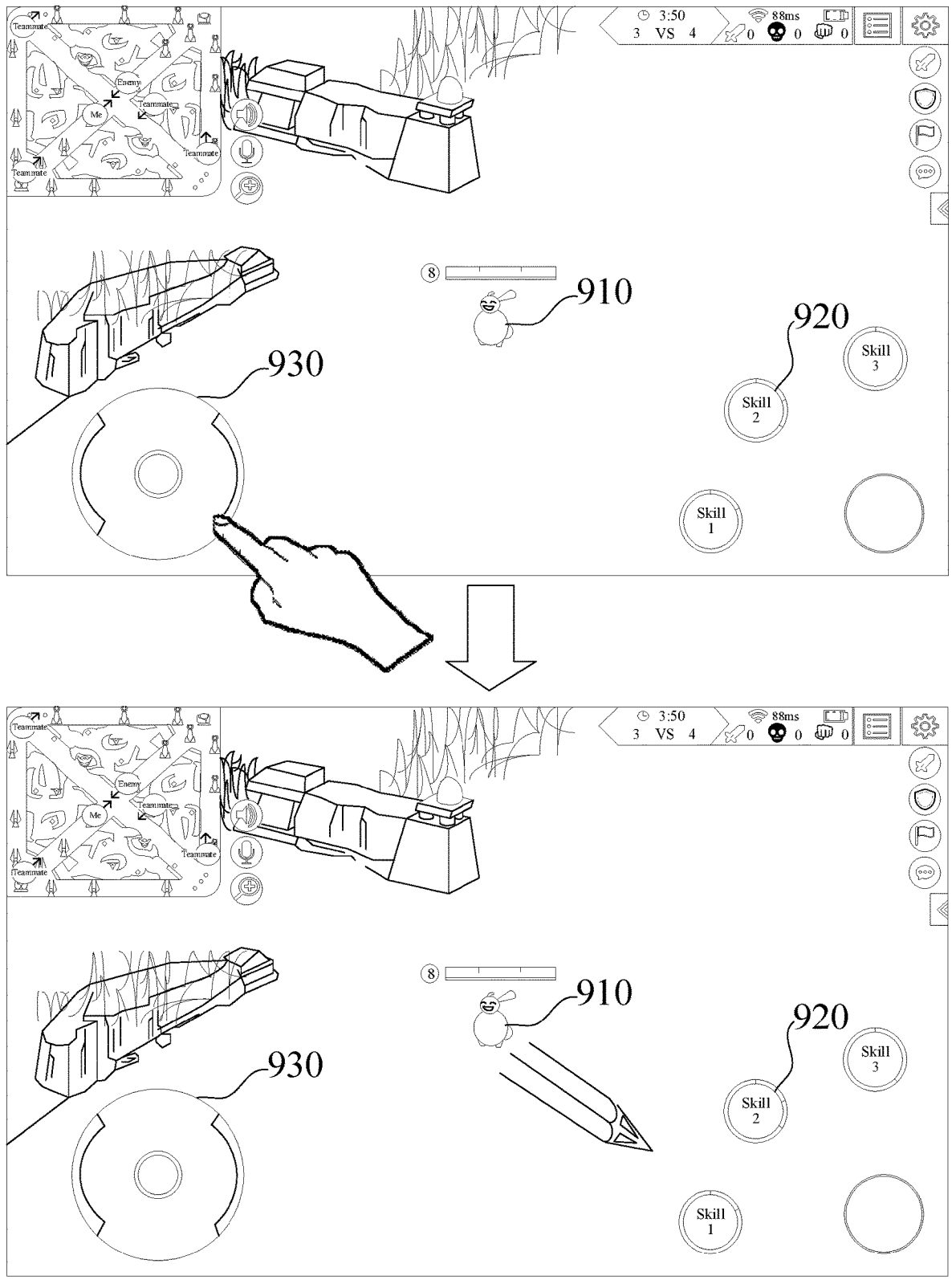
FIG. 9 is a schematic interface diagram of skill cast and movement control according to the embodiment shown in FIG. 7.

For example, referring to FIG. 9, a virtual environment interface 900 includes a main control virtual character 910, a movement joystick 930, and a trigger control 920 of a directional skill. The main control virtual character 910 faces a first direction in a virtual environment, receives a movement control operation on a movement joystick 930, and controls the main control virtual character 910 to face a second direction in the virtual environment. In addition, a client receives a trigger operation on the trigger control 920, so that the client reads the movement control operation on the movement joystick 930 from a presentation layer and casts the directional skill in the second direction.

Based on the above, in the virtual character control method provided in this embodiment of the present disclosure, when the directional skill is cast, if the movement control operation is received, the second direction corresponding to the movement control operation is determined, and the main control virtual character is controlled to cast the directional skill in the second direction rather than in the automatically-selected first direction. Therefore, the directional skill is ensured to be cast in the facing direction of the main control virtual character after adjustment, which improves the accuracy of the directional skill cast and avoids the problem of low man-machine interaction efficiency due to a wrong cast direction and a necessity to cast the directional skill again based on a re-operation of the user after the directional skill cools (that is, re-enters a releasable state after a period of recovery after cast), to improve man-machine interaction efficiency and reduce wrong operations requiring processing by a computer device, thereby improving overall performance of the computer device.

In the method provided in this embodiment, the skill cast data packet is transmitted to the server by the presentation layer of the terminal, and the server feeds back the skill cast feedback packet to the logic layer of the terminal. In this way, skill cast is implemented at the logic layer, and the main control virtual character is controlled to cast the directional skill in the second direction at the presentation layer, which improves the accuracy of the directional skill cast.

Figure 10:
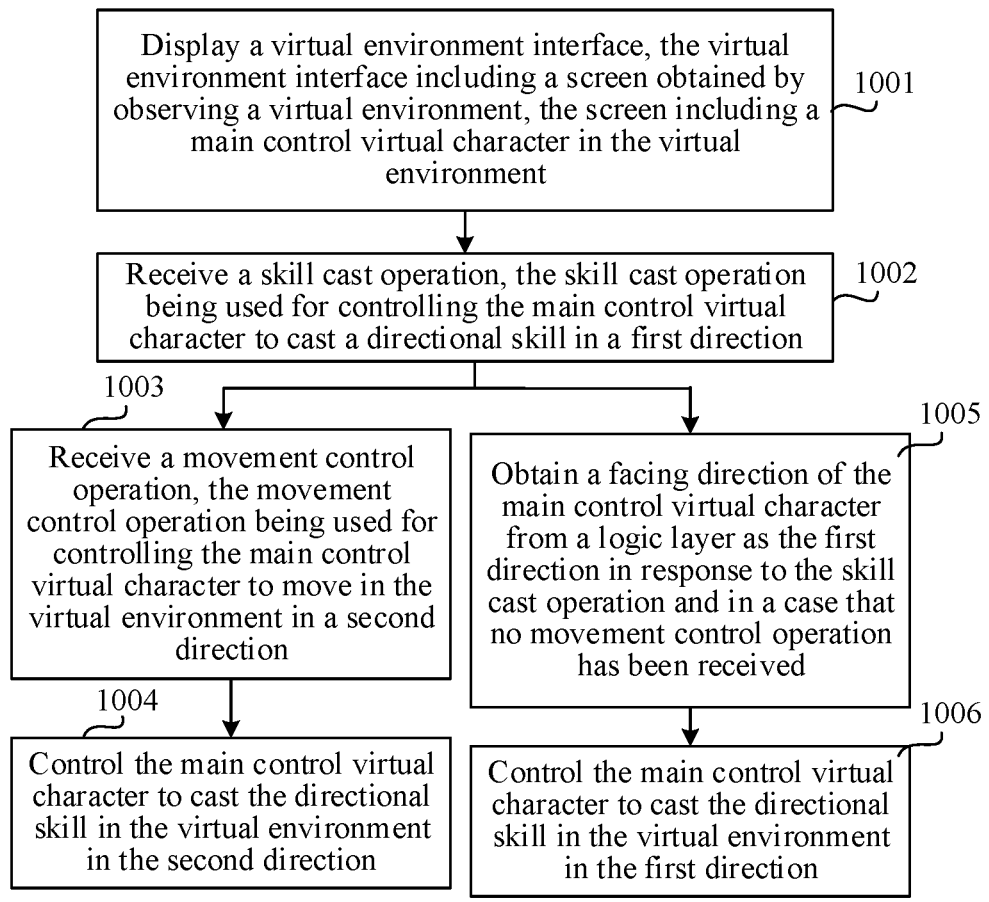
FIG. 10 is a flowchart of a virtual character control method according to another exemplary embodiment of the present disclosure.

In some embodiments, when no movement control operation on the movement control has been received (e.g., at the same time of receiving the skill cast operation), the facing direction of the main control virtual character is directly obtained from the logic layer for skill cast. FIG. 10 is a flowchart of a virtual character control method according to another exemplary embodiment of the present disclosure. The method may be performed by a computer device. The computer device may be implemented as the first terminal 420 or the second terminal 460 in the computer system 400 shown in FIG. 4 or another terminal in the computer system 400. As shown in FIG. 10, the method includes the following steps:

Step 1001. Display a virtual environment interface, the virtual environment interface including a screen obtained by observing a virtual environment, the screen including a main control virtual character in the virtual environment.

Optionally, the screen superimposes a cast control configured to control the main control virtual character to cast a directional skill, and a movement control configured to control the main control virtual character to move in the virtual environment.

Optionally, to distinguish from correspondingly using the first direction as the cast direction of the skill during the quick cast of the directional skill, in this embodiment of the present disclosure, during the quick cast of the directional skill, a facing direction of the main control virtual character in the virtual environment is obtained, and the directional skill is cast in the facing direction.

Step 1002. Receive a skill cast operation, the skill cast operation being used for controlling the main control virtual character to cast the directional skill in a first direction.

Optionally, the skill cast operation corresponds to quick cast of the directional skill. That is, the main control virtual character is controlled by using the skill cast operation to cast the directional skill in the manner of quick cast. After obtaining the facing direction of the main control virtual character, a client casts the directional skill in the facing direction.

Step 1003. Receive a movement control operation, the movement control operation being used for controlling the main control virtual character to move in the virtual environment in a second direction.

Optionally, the movement control operation is implemented by a drag operation on the movement control. That is, the drag operation on the movement control is received, a drag direction of the drag operation is obtained from a presentation layer, and the second direction corresponding to the drag direction is determined.

Optionally, after receiving the movement control operation, a movement control data packet is transmitted to a server. The movement control data packet includes the second direction. A movement control feedback packet transmitted by the server is received. In response to the movement control feedback packet, the main control virtual character is controlled to move toward the second direction in the virtual environment.

Optionally, in response to the movement control feedback packet, the second direction is cached in a logic layer as the facing direction of the main control virtual character.

For steps 1002 and 1003, step 1002 may be performed before step 1003, or step 1003 may be performed before step 1002, or step 1002 and step 1003 may be performed simultaneously. The sequence of performing step 1003 and step 1002 is not limited in this embodiment of the present disclosure.

Step 1004. Control the main control virtual character to cast the directional skill in the virtual environment in the second direction.

Optionally, the presentation layer transmits a skill cast data packet to the server. The skill cast data packet includes the second direction. The logic layer receives a skill cast feedback packet fed back by the server, and controls, according to the skill cast feedback packet, the main control virtual character to cast the skill in the virtual environment in the second direction.

Step 1005. Obtain the facing direction of the main control virtual character from the logic layer as the first direction in response to the skill cast operation and when no movement control operation has been received.

Optionally, when the skill cast operation is received and no movement control operation is triggered on the movement control, that is, during casting of the directional skill, no adjustment is made to the facing direction of the main control virtual character, a current facing direction of the main control virtual character is used as the first direction for skill cast.

Step 1006. Control the main control virtual character to cast the directional skill in the virtual environment in the first direction.

Optionally, the skill cast data packet is transmitted to the server. The skill cast data packet includes the first direction. The logic layer receives the skill cast feedback packet fed back by the server, and controls, according to the skill cast feedback packet, the main control virtual character to cast the skill in the virtual environment in the first direction.

Figure 11:
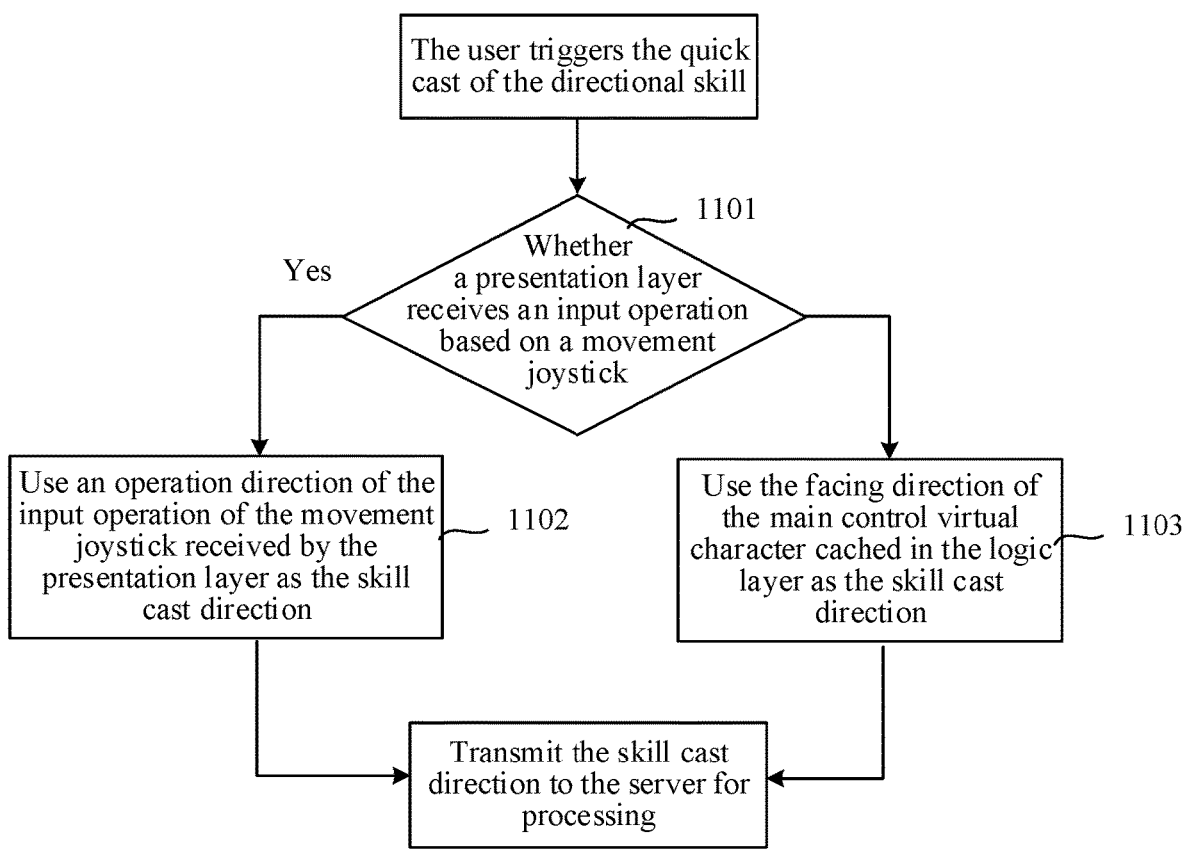
FIG. 11 is a flowchart of a skill cast process according to the embodiment shown in FIG. 10.

For example, referring to FIG. 11, that the user triggers the quick cast of the directional skill may be implemented as the following process:

Step 1101. Determine whether the presentation layer receives an input operation based on the movement joystick; and if yes, perform step 1102; otherwise, perform step 1103.

Step 1102. Use an operation direction of the input operation of the movement joystick received by the presentation layer as the skill cast direction.

Step 1103. Use the facing direction of the main control virtual character cached in the logic layer as the skill cast direction.

Based on the above, in the method provided in this embodiment, when the skill cast operation is received, whether the movement control operation is received on the movement control is determined. When the movement control operation is received, the directional skill is controlled to be cast in the movement control direction in the presentation layer. When no movement control operation has been received, the directional skill is controlled to be cast in the facing direction in the logic layer. In this way, an accurate cast direction of the directional skill during casting is determined, which improves the accuracy of directional skill cast.

Figure 12:
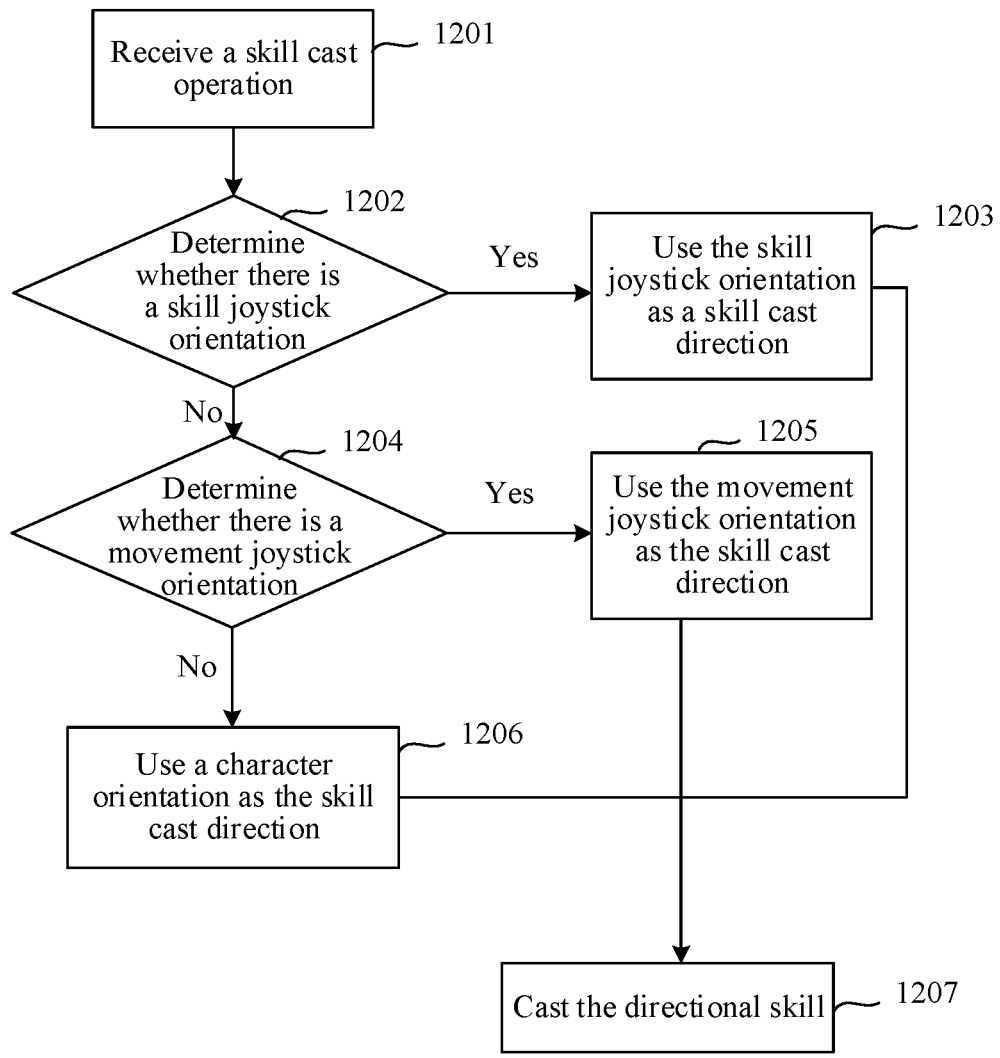
FIG. 12 is an overall flowchart of a skill cast process according to an exemplary embodiment of the present disclosure.

For example, FIG. 12 is an overall flowchart of a skill cast process according to an exemplary embodiment of the present disclosure. As shown in FIG. 12, the process includes the following steps:

Step 1201. Receive a skill cast operation.

Optionally, the skill cast operation is used for controlling a main control virtual character to cast a directional skill in a virtual environment.

Step 1202. Determine whether there is a skill joystick orientation; and if yes, perform step 1203; otherwise, perform step 1204.

Optionally, the skill joystick orientation is used for distinguishing cast manners of the directional skill. The cast manners include quick cast and aiming cast. When there is a skill joystick orientation, it indicates that a current cast manner of the directional skill is aiming cast. When there is no skill joystick orientation, it indicates that the current cast manner of the directional skill is quick cast.

Step 1203. Use the skill joystick orientation as a skill cast direction.

Optionally, when there is a skill joystick orientation, it indicates that the current cast manner of the directional skill is aiming cast, and then the skill joystick orientation is used as the skill cast direction.

Step 1204. Determine whether there is a movement joystick orientation; and if yes, perform step 1205; otherwise, perform step 1206.

Optionally, when there is no movement joystick orientation, it indicates that the current cast manner of the directional skill is quick cast, and then whether the facing direction of the main control virtual character needs to be adjusted by using the movement joystick orientation during the quick cast is further determined.

Step 1205. Use the movement joystick orientation as the skill cast direction.

When there is a movement joystick orientation, that is, the facing direction of the main control virtual character needs to be adjusted, the movement joystick orientation is used as the skill cast direction.

Step 1206. Use a character orientation as the skill cast direction.

When there is no movement joystick orientation, that is, the facing direction of the main control virtual character is not adjusted, the current facing direction of the main control virtual character is used as the skill cast direction.

Step 1207. Cast the directional skill.

Figure 13:
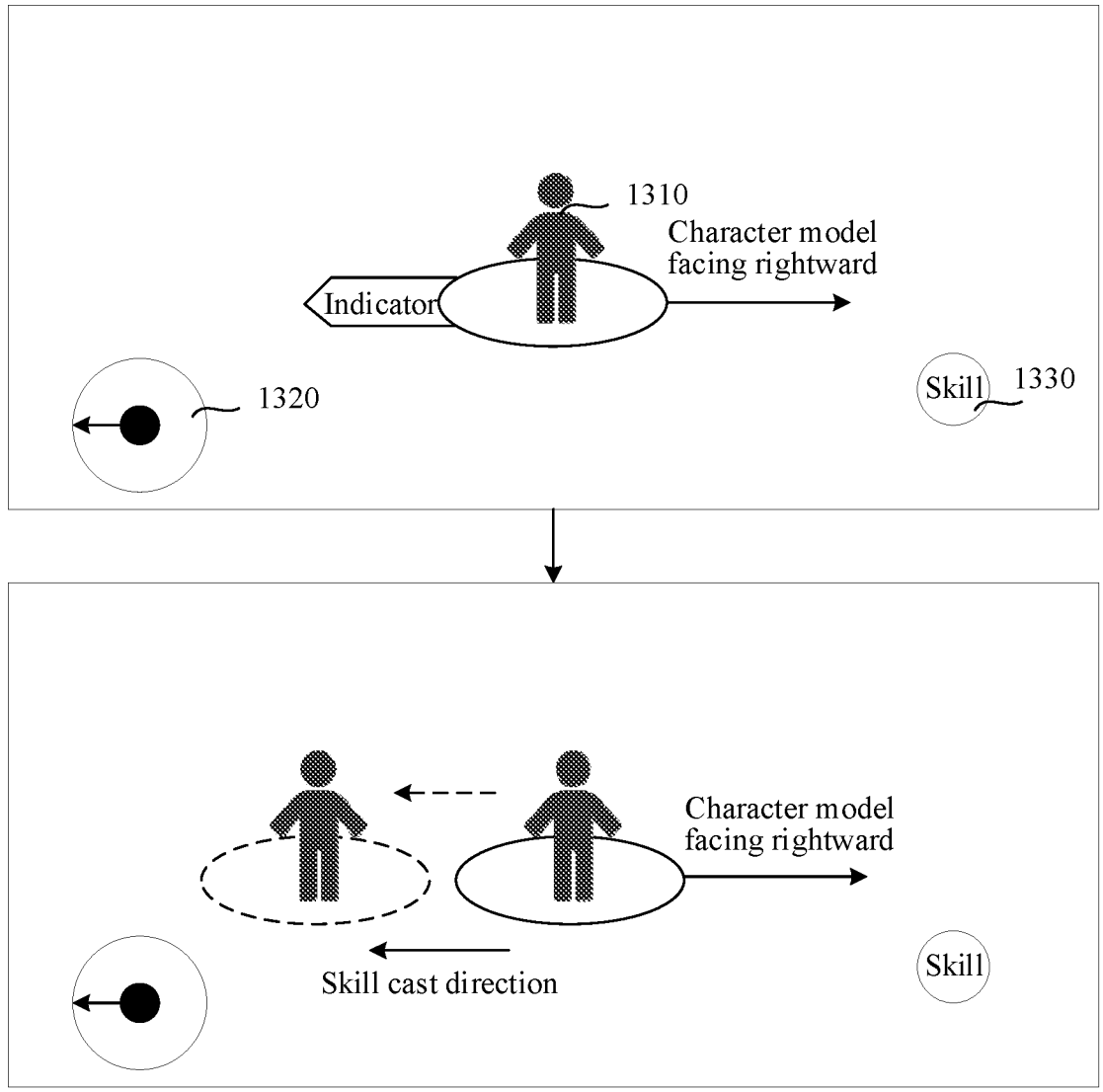
FIG. 13 is a schematic diagram of a virtual environment interface of quick cast of a directional skill according to an exemplary embodiment of the present disclosure.

When the cast manner of the directional skill is quick cast, FIG. 13 is a schematic diagram of a virtual environment interface of quick cast of a directional skill according to an exemplary embodiment of the present disclosure. As shown in FIG. 13, the virtual environment interface includes a main control virtual character 1310, a movement joystick 1320, and a trigger control 1330 of a directional skill. In an initial state, the main control virtual character 1310 faces rightward (a first direction) in a virtual environment. A terminal receives a movement control operation of a user based on the movement joystick 1320, and controls the main control virtual character 1310 to move leftward. At the same time, the main control virtual character is changed to face leftward (a second direction) in the virtual environment. When the terminal receives the movement control operation of the user based on the movement joystick 1320 and a trigger operation of the user on the trigger control 1330 of the directional skill at the same time, it is assumed that the user needs to turn the facing direction of the main control virtual character 1310 and cast the directional skill in the direction (the second direction) of the main control virtual character 1310 after changing. However, it takes certain time to turn the direction of the main control virtual character during the user's operation. When the user casts the directional skill in a manner of quick cast, the following two wrong operation results may be caused: One result is low interaction efficiency due to the fact that after observing completion of direction turning of the main control virtual character, the user performs a quick cast operation on the directional skill, but there is certain delay from the user observing the completion of direction turning of the main control virtual character to performing the quick cast operation. The other result is a mis-operation due to the fact that the user performs a quick cast operation when direction turning of the main control virtual character has not been completed and consequently the cast direction of the directional skill is still the direction before the turning (the first direction), which is not consistent with the user's operation intent. However, by this solution, in the process in which the user controls the main control virtual character to move in a target direction, after the quick cast operation is performed on the main control virtual character, the second direction is determined as the cast direction of the directional skill. That is, the main control virtual character will cast the directional skill in the movement direction. From the perspective of an actual control effect, the main control virtual character ignores the current orientation and directly casts the directional skill in the direction corresponding to the user's movement control operation, so that during quick cast of the directional skill, not only the interaction efficiency can be ensured, but also the accuracy of skill cast is improved.

Based on the above, in the virtual character control method provided in this embodiment of the present disclosure, when the directional skill is cast, if the movement control operation is received, the second direction corresponding to the movement control operation is determined, and the main control virtual character is controlled to cast the directional skill in the second direction rather than in the automatically-selected first direction. Therefore, the directional skill is ensured to be cast in the facing direction of the main control virtual character after adjustment, which improves the accuracy of the directional skill cast and avoids the problem of low man-machine interaction efficiency due to a wrong cast direction and a necessity to cast the directional skill again based on a re-operation of the user after the directional skill cools (that is, re-enters a releasable state after a period of recovery after cast), to improve man-machine interaction efficiency and reduce wrong operations requiring processing by a computer device, thereby improving overall performance of the computer device.

Figure 14:
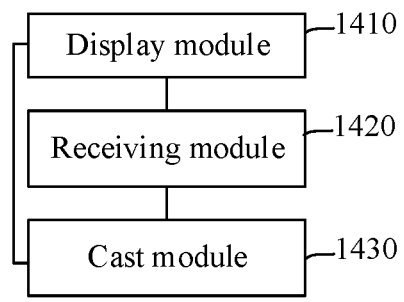
FIG. 14 is a structural block diagram of a virtual character control apparatus according to an exemplary embodiment of the present disclosure.

FIG. 14 is a structural block diagram of a virtual character control apparatus according to an exemplary embodiment of the present disclosure. As shown in FIG. 14, the apparatus includes:

a display module 1410, configured to display a virtual environment interface, the virtual environment interface including a screen obtained by observing a virtual environment, the screen including a main control virtual character in the virtual environment;

a receiving module 1420, configured to receive a skill cast operation and a movement control operation, the skill cast operation being used for controlling the main control virtual character to cast a directional skill in the virtual environment in a first direction, and the movement control operation being used for controlling the main control virtual character to move in a second direction in the virtual environment; and a cast module 1430, configured to control, in response to the skill cast operation and the movement control operation, the main control virtual character to cast the directional skill in the virtual environment in the second direction.

In some embodiments, the virtual environment interface further includes a movement control, and the movement control operation is a drag operation received on the movement control; and the receiving module 1420 is further configured to receive the drag operation on the movement control.

Figure 15:
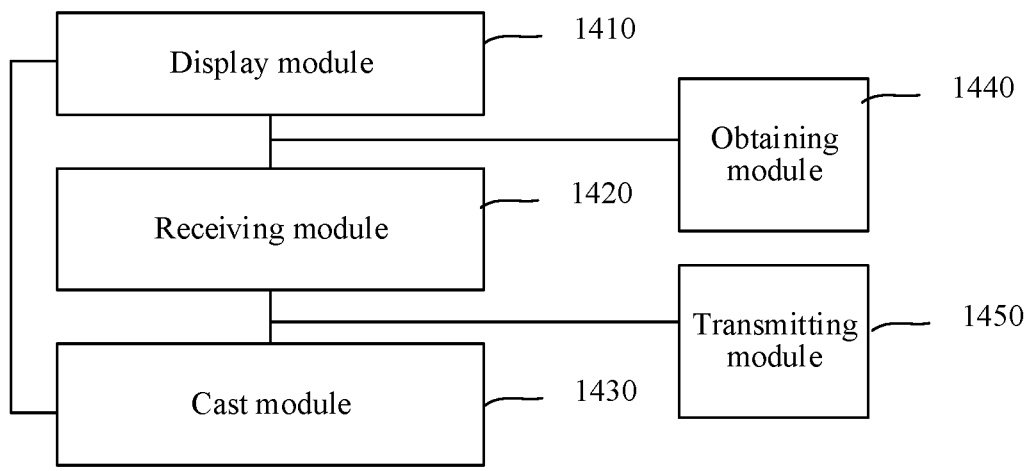
FIG. 15 is a structural block diagram of a virtual character control apparatus according to another exemplary embodiment of the present disclosure.

In some embodiments, as shown in FIG. 15, the apparatus further includes:

an obtaining module 1440, configured to obtain a drag direction of the drag operation from a presentation layer, and determine, according to the drag direction, the second direction to which the main control virtual character corresponds during movement.

In some embodiments, the apparatus further includes:

a transmitting module 1450, configured to transmit a skill cast data packet to a server, the skill cast data packet including the second direction;

the receiving module 1420, further configured to receive a skill cast feedback packet transmitted by the server; and the cast module 1430, further configured to control, in response to the skill cast feedback packet, the main control virtual character to cast the directional skill in the virtual environment in the second direction.

In some embodiments, the transmitting module 1450 is configured to transmit a movement control data packet to the server in response to the movement control operation, the movement control data packet including the second direction;

the receiving module 1420 is further configured to receive a movement control feedback packet transmitted by the server; and the apparatus further includes:

a movement module, configured to control, in response to the movement control feedback packet, the main control virtual character to move toward the second direction in the virtual environment.

In some embodiments, the apparatus further includes:

a cache module, configured to cache the second direction in a logic layer as a facing direction of the main control virtual character in response to the movement control feedback packet.

In some embodiments, the obtaining module 1440 is further configured to obtain the facing direction of the main control virtual character from the logic layer as the first direction in response to the skill cast operation and when no movement control operation has been received; and the cast module 1430 is further configured to control the main control virtual character to cast the directional skill in the virtual environment in the first direction.

In some embodiments, the virtual environment interface further includes a skill cast control; and the receiving module 1420 is configured to receive a first trigger operation in a first region of the skill cast control as the skill cast operation.

In some embodiments, the receiving module 1420 is further configured to: receive a second trigger operation in a second region of the skill cast control, the second region being a region corresponding to the skill cast control other than the first region, and determine a cast direction corresponding to the second trigger operation; and the cast module 1430 is further configured to control the main control virtual character to cast the directional skill in the virtual environment in the cast direction.

Based on the above, by means of the virtual character control apparatus provided in this embodiment of the present disclosure, when the directional skill is cast, if the movement control operation is received, the second direction corresponding to the movement control operation is determined, and the main control virtual character is controlled to cast the directional skill in the second direction rather than in the automatically-selected first direction. Therefore, the directional skill is ensured to be cast in the facing direction of the main control virtual character after adjustment, which improves the accuracy of the directional skill cast and avoids the problem of low man-machine interaction efficiency due to a wrong cast direction and a necessity to cast the directional skill again based on a re-operation of the user after the directional skill cools (that is, re-enters a releasable state after a period of recovery after cast), to improve man-machine interaction efficiency and reduce wrong operations requiring processing by a computer device, thereby improving overall performance of the computer device.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The present disclosure further provides a terminal, including a processor and a memory, the memory storing at least one instruction, the at least one instruction being loaded and executed by the processor to implement the steps that are performed by a first terminal or a second terminal and that are of the virtual character control method provided in the foregoing method embodiments. The terminal may be a terminal provided in FIG. 16 below.

Figure 16:
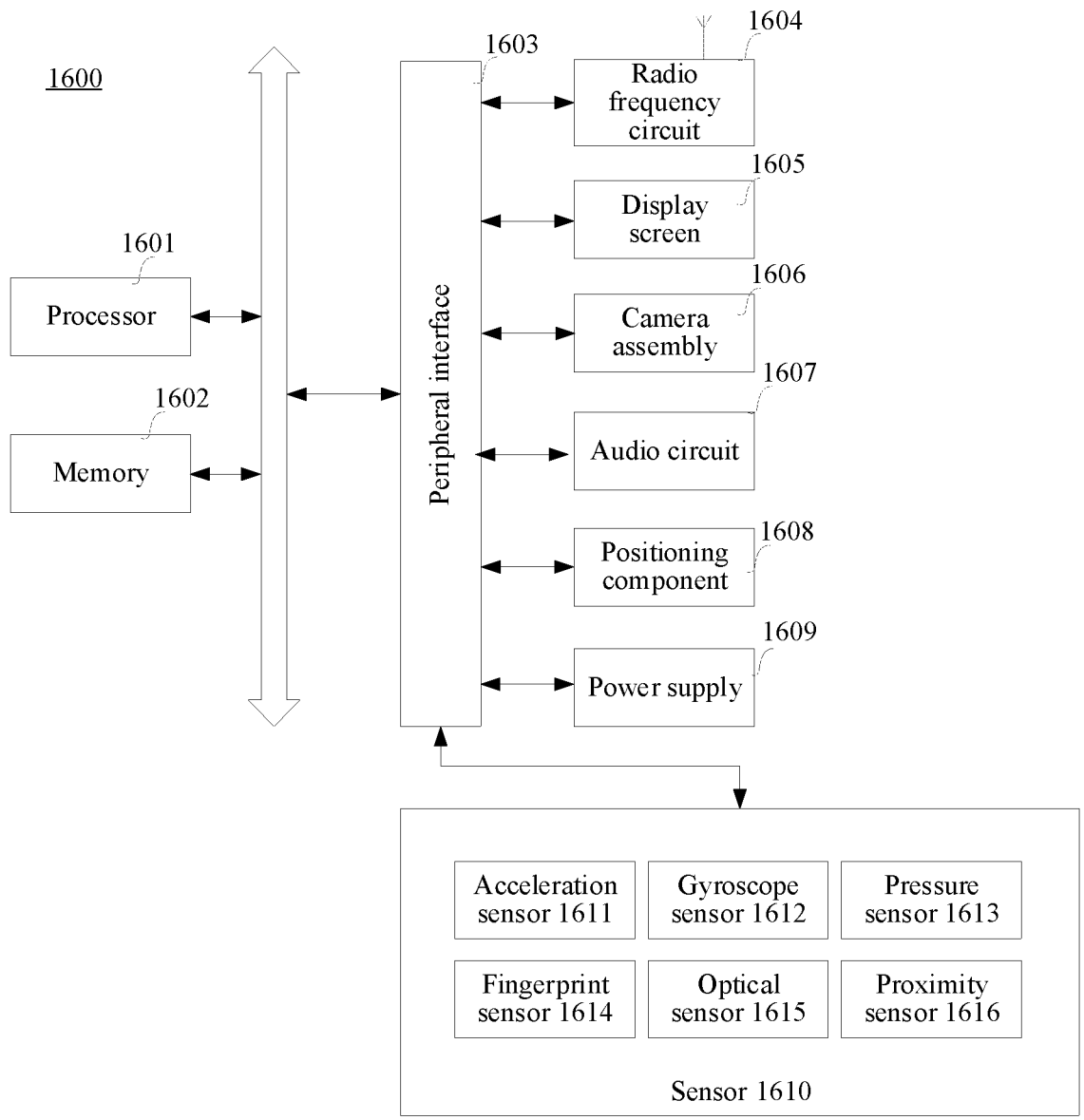
FIG. 16 is a structural block diagram of a terminal according to an exemplary embodiment of the present disclosure.

FIG. 16 is a structural block diagram of a terminal 1600 according to an exemplary embodiment of the present disclosure. The terminal 1600 may be a smartphone, a tablet computer, an MP3 player, an MP4 player, a notebook computer, or a desktop computer. The terminal 1600 may also be referred to as another name such as user equipment, a portable terminal, a laptop terminal, or a desktop terminal.

Generally, the terminal 1600 includes a processor 1601 and a memory 1602.

The processor 1601 may include one or more processing cores. For example, the processor 1601 may be a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is configured to process data in an active state, also referred to as a central processing unit (CPU). The coprocessor is a low-power processor configured to process data in a standby state. In some embodiments, the processor 1601 may be integrated with a graphics processing unit (GPU). The GPU is configured to render and draw content that needs to be displayed on a display. In some embodiments, the processor 1601 may further include an artificial intelligence (AI) processor. The AI processor is configured to process a computing operation related to machine learning.

The memory 1602 may include one or more computer-readable storage media. The computer-readable storage media may be non-transient. The memory 1602 may further include a high-speed random access memory (RAM) and a non-volatile memory, for example, one or more disk storage devices or flash memory devices. In some embodiments, the non-transient computer-readable storage media in the memory 1602 are configured to store at least one instruction. The at least one instruction is executed by the processor 1601 to perform the virtual character control method provided in the method embodiments of the present disclosure.

In some embodiments, the terminal 1600 may alternatively include: a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. Specifically, the peripheral includes at least one of a radio frequency (RF) circuit 1604, a display screen 1605, a camera assembly 1606, an audio circuit 1607, a positioning component 1608, and a power supply 1609.

In some embodiments, the terminal 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

A person skilled in the art may understand that a structure shown in FIG. 16 constitutes no limitation on the terminal 1600, and the terminal may include more or fewer components than those shown in the figure, or some components may be combined, or a different component deployment may be used.

The memory further includes one or more programs. The one or more programs are stored in the memory and include all or some of the steps for performing the virtual character control method provided in the embodiments of the present disclosure.

The present disclosure provides a computer-readable storage medium, storing at least one instruction, the at least one instruction being loaded and executed by a processor to implement all or some of the steps in the virtual character control method provided in the foregoing method embodiments.

The present disclosure further provides a computer program product or a computer program, including computer instructions, the computer instructions being stored in a computer-readable storage medium. A processor of a computer device reads the computer instructions from the computer-readable storage medium, and the processor executes the computer instructions, to cause the computer device to perform all or some of the steps in the virtual character control method provided in the foregoing method embodiments.

The sequence numbers of the foregoing embodiments of the present disclosure are merely for description purpose, and are not intended to indicate the preference among the embodiments.

A person of ordinary skill in the art may understand that all or some of the steps of the foregoing embodiments may be implemented by hardware, or may be implemented by a program instructing related hardware. The program may be stored in a computer-readable storage medium. The storage medium may be: a read-only memory (ROM), a magnetic disk, or an optical disc.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A virtual character control method, performed by a computer device, the method comprising:
    displaying a virtual environment interface, the virtual environment interface comprising a screen obtained by observing a virtual environment, the screen comprising a main control virtual character in the virtual environment;
    while the main control virtual character is facing a first direction, receiving, simultaneously or substantially at the same time, a skill cast operation and a movement control operation for controlling the main control virtual character to move in a second direction, the skill cast operation being configured to control the main control virtual character to cast a directional skill in the virtual environment in a direction that the main control virtual character is facing, the first direction and the second direction being different; and
    controlling, in response to the skill cast operation and the movement control operation, the main control virtual character to cast the directional skill in the virtual environment in the second direction, comprising:
        transmitting a skill cast data packet corresponding to the skill cast operation to the server, the skill cast data packet comprising the second direction obtained by a presentation layer of a game client;
        receiving, by a logic layer of the game client, a skill cast feedback packet transmitted by the server, the skill cast feedback packet being configured to trigger the logic layer to perform logic processing for casting the directional skill in the second direction; and
        controlling, in response to the skill cast feedback packet, the main control virtual character to cast the directional skill in the virtual environment in the second direction, wherein the logic layer cannot directly access data at the presentation layer and the presentation layer cannot modify logic at the logic layer.

2. The method according to claim 1, wherein the virtual environment interface further comprises a movement control, and the movement control operation is a drag operation performed on the movement control; and
    the method further comprises:
    receiving the drag operation on the movement control;
    obtaining a drag direction of the drag operation from a presentation layer; and
    determining, according to the drag direction, the second direction corresponding to a movement of the main control virtual character.

3. The method according to claim 1, further comprising:
    transmitting a movement control packet corresponding to the movement control operation to the server;
    receiving a movement control feedback packet transmitted by the server;
    controlling, in response to the movement control feedback packet, the main control virtual character to move toward the second direction in the virtual environment.

4. The method according to claim 3, wherein the directional skill is cast in the second direction regardless of whether the main control virtual character has completed moving toward the second direction.

5. The method according to claim 1, further comprising:
    transmitting a movement control data packet to the server in response to the movement control operation, the movement control data packet comprising the second direction;
    receiving a movement control feedback packet transmitted by the server; and
    controlling, in response to the movement control feedback packet, the main control virtual character to move toward the second direction in the virtual environment.

6. The method according to claim 5, wherein after the receiving a movement control feedback packet transmitted by the server, the method further comprises:
    caching the second direction in a logic layer as a facing direction of the main control virtual character in response to the movement control feedback packet.

7. The method according to claim 6, further comprising:
    obtaining the facing direction of the main control virtual character from the logic layer as the first direction in response to the skill cast operation and when no movement control operation has been received; and
    controlling the main control virtual character to cast the directional skill in the virtual environment in the first direction.

8. The method according to claim 1, wherein the virtual environment interface further comprises a skill cast control; and
    the receiving a skill cast operation comprises:
    receiving a first trigger operation in a first region of the skill cast control as the skill cast operation.

9. The method according to claim 8, further comprising:
    receiving a second trigger operation in a second region of the skill cast control, the second region being a region corresponding to the skill cast control other than the first region;
    determining a cast direction corresponding to the second trigger operation; and
    controlling the main control virtual character to cast the directional skill in the virtual environment in the cast direction.

10. A virtual character control apparatus, comprising a processor and a memory, the memory storing a computer program that, when being loaded and executed by the processor, causes the processor to:
    display a virtual environment interface, the virtual environment interface comprising a screen obtained by observing a virtual environment, the screen comprising a main control virtual character in the virtual environment;

while the main control virtual character is facing a first direction, receive, simultaneously or substantially at the same time, a skill cast operation and a movement control operation for controlling the main control virtual character to move in a second direction, the skill cast operation being configured to control the main control virtual character to cast a directional skill in the virtual environment in a direction that the main control virtual character is facing, the first direction and the second direction being different; and control, in response to the skill cast operation and the movement control operation, the main control virtual character to cast the directional skill in the virtual environment in the second direction, comprising:
transmitting a skill cast data packet corresponding to the skill cast operation to a server, the skill cast data packet comprising the second direction obtained by a presentation layer of a game client;
receiving, by a logic layer of the game client, a skill cast feedback packet transmitted by the server, the skill cast feedback packet being configured to trigger the logic layer to perform logic processing for casting the directional skill in the second direction; and
controlling, in response to the skill cast feedback packet, the main control virtual character to cast the directional skill in the virtual environment in the second direction, wherein the logic layer cannot directly access data at the presentation layer and the presentation layer cannot modify logic at the logic layer.

11. The apparatus according to claim 10, wherein the virtual environment interface further comprises a movement control, and the movement control operation is a drag operation received on the movement control;
the processor is further configured to:
receive the drag operation on the movement control; and
obtain a drag direction of the drag operation from a presentation layer; and
determine, according to the drag direction, the second direction corresponding to a movement of the main control virtual character.

12. The apparatus according to claim 10, wherein the processor is further configured to:
transmit a movement control data packet to the server in response to the movement control operation, the movement control data packet comprising the second direction;
receive a movement control feedback packet transmitted by the server; and
control, in response to the movement control feedback packet, the main control virtual character to move toward the second direction in the virtual environment.

13. The apparatus according to claim 12, wherein the processor is further configured to:
cache the second direction in a logic layer as a facing direction of the main control virtual character in response to the movement control feedback packet.

14. The apparatus according to claim 13, wherein the processor is further configured to:
obtain the facing direction of the main control virtual character from the logic layer as the first direction in response to the skill cast operation and when no movement control operation has been received; and
control the main control virtual character to cast the directional skill in the virtual environment in the first direction.

15. The apparatus according to claim 10, wherein the virtual environment interface further comprises a skill cast control; and
the processor is further configured to receive a first trigger operation in a first region of the skill cast control as the skill cast operation.

16. The apparatus according to claim 15, wherein the processor is further configured to:
receive a second trigger operation in a second region of the skill cast control, the second region being a region corresponding to the skill cast control other than the first region, and determine a cast direction corresponding to the second trigger operation; and
control the main control virtual character to cast the directional skill in the virtual environment in the cast direction.

17. A non-transitory computer-readable storage medium, storing at least one computer program, the computer program being loaded and executed by a processor to implement:
displaying a virtual environment interface, the virtual environment interface comprising a screen obtained by observing a virtual environment, the screen comprising a main control virtual character in the virtual environment;
while the main control virtual character is facing a first direction, receiving, simultaneously or substantially at the same time, a skill cast operation and a movement control operation for controlling the main control virtual character to move in a second direction, the skill cast operation being configured to control the main control virtual character to cast a directional skill in the virtual environment in a direction that the main control virtual character is facing, the first direction and the second direction being different; and
controlling, in response to the skill cast operation and the movement control operation, the main control virtual character to cast the directional skill in the virtual environment in the second direction, comprising:
transmitting a skill cast data packet corresponding to the skill cast operation to a server, the skill cast data packet comprising the second direction obtained by a presentation layer of a game client;
receiving, by a logic layer of the game client, a skill cast feedback packet transmitted by the server, the skill cast feedback packet being configured to trigger the logic layer to perform logic processing for casting the directional skill in the second direction; and
controlling, in response to the skill cast feedback packet, the main control virtual character to cast the directional skill in the virtual environment in the second direction, wherein the logic layer cannot directly access data at the presentation layer and the presentation layer cannot modify logic at the logic layer.

* * * * *